US010460443B2

United States Patent
Jeong et al.

(10) Patent No.: US 10,460,443 B2
(45) Date of Patent: Oct. 29, 2019

(54) ELECTRONIC DEVICE AND METHOD FOR APPLYING CORRECTION SCHEME(S) TO AN IMAGE

(71) Applicant: Samsung Electronics Co., Ltd., Gyeonggi-do (KR)

(72) Inventors: Ha-Wook Jeong, Seoul (KR); Tae-Hwa Hong, Seoul (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/658,770

(22) Filed: Jul. 25, 2017

(65) Prior Publication Data
US 2018/0033149 A1    Feb. 1, 2018

(30) Foreign Application Priority Data

Jul. 28, 2016    (KR) .................. 10-2016-0096036

(51) Int. Cl.
*G06T 7/11*    (2017.01)
*G06T 7/536*    (2017.01)
(Continued)

(52) U.S. Cl.
CPC ............ *G06T 7/11* (2017.01); *G06K 9/00228* (2013.01); *G06K 9/00369* (2013.01); *G06K 9/22* (2013.01);
(Continued)

(58) Field of Classification Search
CPC ....... G06T 3/40; G06T 3/4007; G06T 3/4046; G06T 2207/20021
See application file for complete search history.

(56) References Cited

U.S. PATENT DOCUMENTS

| 7,587,083 B2 | 9/2009 | Tabata et al. |
| 8,976,230 B1 | 3/2015 | Vendrow |

(Continued)

FOREIGN PATENT DOCUMENTS

| JP | 2008-123086 A | 5/2008 |
| KR | 10-0818989 B1 | 4/2008 |

(Continued)

OTHER PUBLICATIONS

European Search Report dated May 28, 2018.
(Continued)

*Primary Examiner* — Jeffery A Brier
(74) *Attorney, Agent, or Firm* — Steve Cha

(57) ABSTRACT

Provided is an electronic device including a display configured to display a first image; and one or more processors electrically connected with the display, wherein the one or more processors are configured to: select a region surrounding a first object comprising a first sub-region surrounding a first part of the first object and a second sub-region surrounding a second part of the first object from the first image, apply a first correction scheme to the first sub-region surrounding the first part of the first object, apply a second correction scheme to the second sub-region surrounding the second part of the first object, and generate a second image comprising the corrected first sub-region surrounding the first part of the first object and the corrected second sub-region surrounding the second part of the first object.

17 Claims, 18 Drawing Sheets

(51) Int. Cl.
*G06T 3/40* (2006.01)
*G06K 9/00* (2006.01)
*G06K 9/22* (2006.01)
*H04N 5/232* (2006.01)

(52) U.S. Cl.
CPC ............... *G06T 3/40* (2013.01); *G06T 7/536* (2017.01); *H04N 5/23219* (2013.01); *H04N 5/23293* (2013.01); *G06T 2207/20021* (2013.01)

(56) References Cited

U.S. PATENT DOCUMENTS

| | | | |
|---|---|---|---|
| 10,013,736 B1 * | 7/2018 | Lee | G06T 3/00 |
| 2006/0204055 A1 | 9/2006 | Steinberg et al. | |
| 2007/0147701 A1 * | 6/2007 | Tanaka | H04N 5/23219 382/274 |
| 2008/0112648 A1 | 5/2008 | Hatano | |
| 2010/0188521 A1 | 7/2010 | Minagawa et al. | |
| 2011/0149094 A1 | 6/2011 | Chen et al. | |
| 2013/0215319 A1 * | 8/2013 | Tomita | G02B 7/28 348/345 |
| 2014/0211994 A1 * | 7/2014 | Takenaka | G06K 9/00362 382/103 |
| 2015/0086132 A1 | 3/2015 | Tsukagoshi | |
| 2015/0091900 A1 | 4/2015 | Yang et al. | |

FOREIGN PATENT DOCUMENTS

| | | |
|---|---|---|
| KR | 10-2013-0106113 A | 9/2013 |
| KR | 10-1498442 B1 | 2/2015 |
| KR | 10-2015-0027555 A | 3/2015 |

OTHER PUBLICATIONS

European Search Report dated Oct. 23, 2017.
Adobe: "Adobe Photoshop CC Help", Nov. 30, 2015, https://helpx.adobe.com/archive/en/photoshop/cc/2015/photoshop_reference.pdf.
European Search Report dated Sep. 2, 2019.

* cited by examiner

ELECTRONIC DEVICE AND METHOD FOR APPLYING CORRECTION SCHEME(S) TO AN IMAGE

CLAIM OF PRIORITY

This application claims the benefit under 35 U.S.C. § 119(a) of a Korean patent application filed in the Korean Intellectual Property Office on Jul. 28, 2016 and assigned Serial No. 10-2016-0096036, the entire disclosure of which is incorporated herein by reference, for all purposes.

TECHNICAL FIELD

The present disclosure relates to a function of correcting an image by an electronic device, and more particularly, to a method and electronic device for dividing an object included in an image into a plurality of regions and applying different correction schemes to the respective regions.

BACKGROUND

Recently, various electronic devices such as smart phones, tablet personal computers (PCs), portable multimedia players (PMPs), MP3 players, wearable devices, and/or the like, have been widely spread to users. Users may access a variety of contents through those various electronic devices.

Most electronic devices have camera modules mounted thereto to allow users to photograph desired objects anytime and anywhere. Under certain conditions, distortion may occur in a photograph in which a face is shown and legs look short. Other shortcomings of conventional approaches will become evident upon comparison of such approaches with the remainder of the present application with reference to the drawings.

The above information is presented as background information only to assist with an understanding of the present disclosure. No determination has been made, and no assertion is made, as to whether any of the above might be applicable as prior art with regard to the present disclosure.

SUMMARY

Accordingly, the present disclosure provides, among other things, an electronic device that may automatically detecting body parts including a face and can obtain a quality-improved corrected image by applying different correction schemes to the respective body parts, and a method for controlling the electronic device.

According to various embodiments, an electronic device comprising: a display configured to display a first image; and one or more processors electrically connected with the display, wherein the one or more processors are configured to: select a region surrounding a first object comprising a first sub-region surrounding a first part of the first object and a second sub-region surrounding a second part of the first object from the first image, apply a first correction scheme to the first sub-region surrounding the first part of the first object, apply a second correction scheme to the second sub-region surrounding the second part of the first object, and generate a second image comprising the corrected first sub-region surrounding the first part of the first object and the corrected second sub-region surrounding the second part of the first object.

According to various embodiments, the first correction scheme is a correction scheme that changes a size of the first sub-region surrounding the first part of the first object, and the second correction scheme is a correction scheme that performs perspective transformation with respect to the second sub-region surrounding the second part of the first object.

According to various embodiments the one or more processors are further configured to determine the second correction scheme with respect to the second sub-region surrounding the second part of the first object based on a result of correction with respect to the first sub-region surrounding a first part of the first object to which the first correction scheme is applied.

According to various embodiments the one or more processors are further configured to apply a third correction scheme with respect to a region surrounding a second object of the first image, wherein the region surrounding the first object and the region surrounding the second object are non-overlapping.

According to various embodiments, the one or more processors are further configured to select the third correction scheme with respect to the region surrounding the second object based on at least one of a result of correction with respect to the first sub-region surrounding a first part of the first object and a result of correction with respect to the second sub-region surrounding the second part of the first object.

According to various embodiments, an electronic device comprises a display configured to display a first image; and one or more processors electrically connected with the display, wherein the one or more processors are configured to: select a region surrounding a first object from the first image comprising a first sub-region surrounding a first part of the first object and a second sub-region surrounding a second part of the first object, divide the first image into a plurality of divisions comprising a first division and a second division, dispose the first sub-region surrounding the first part of the first object in the first division, dispose the second sub-region surrounding the second part of first object in the second division, apply a first correction scheme to the first division, apply a second correction scheme to the second division, and generate a second image comprising the corrected first division and the corrected second division.

According to various embodiments, the first correction scheme is a correction scheme that changes a size of the first division, and the second correction scheme is a correction scheme that performs perspective transformation with respect to the second division.

According to various embodiments, the one or more processors are further configured to determine the second correction scheme with respect to the second division based on a result of correction with respect to the first division to which the first correction scheme is applied.

According to various embodiments, the one or more processors are further configured to apply a third correction scheme with respect to a region surrounding a second object of the first image, wherein the region surrounding the first object and the region surrounding the second object are non-overlapping.

According to various embodiments, the one or more processors are further configured to select the third correction scheme with respect to the region surrounding the second object based on at least one of a result of correction with respect to the first division and a result of correction with respect to the second division.

According to various embodiments a method for controlling an electronic device, comprises: displaying a first image on a display; selecting, from the first image, a region surrounding a first object in the first image comprising a first sub-region surrounding a first part of the object and a second sub-region surrounding a second part of the object; applying a first correction scheme to the first sub-region surrounding the first part of the first object and applying a second correction scheme to the second sub-region surrounding the second part of the first object; and generating a second image comprising the corrected first sub-region surrounding the first part of the first object and the corrected second sub-region surrounding the second part of the first object.

According to various embodiments, the first correction scheme is a correction scheme that changes a size of the first sub-region surrounding the first part of the first object, and the second correction scheme is a correction scheme that performs perspective transformation with respect to the second sub-region surrounding the second part of the first object.

According to various embodiments, the applying of the second correction scheme to the second sub-region surrounding the second part of the first object comprises determining the second correction scheme with respect to the second sub-region surrounding the second part of the first object based on a result of correction with respect to the first sub-region surrounding the first part of the first object to which the first correction scheme is applied.

According to various embodiments, the applying of the first correction scheme to the first sub-region surrounding the first part of the first object and the applying of the second correction scheme to the second sub-region surrounding the second part of the first object comprise applying a third correction scheme with respect to a second region of the first image except for the first region.

According to various embodiments, wherein the applying of the third correction scheme to the second region except for the first region comprises selecting the third correction scheme with respect to the second region based on at least one of a result of correction with respect to the first sub-region surrounding the first part of the first object and a result of correction with respect to the second sub-region surrounding the second part of the first object.

According to various embodiments, in an electronic device, a method comprises: displaying a first image on a display; selecting, from the first image, a region surrounding a first object comprising a first sub-region surrounding a first part of the first object and a second sub-region surrounding a second part of the first object; dividing the first image into a plurality of divisions comprising a first division and a second division, disposing the first sub-region surrounding the first part of the first object in the first division, and disposing the second sub-region surrounding the second part of the first object in the second division; applying a first correction scheme to the first division and applying a second correction scheme to the second division; and generating a second image comprising the corrected first division and the corrected second division.

According to various embodiments, the applying of the second correction scheme to the second division comprises determining the second correction scheme with respect to the second division based on a result of correction with respect to the first division to which the first correction scheme is applied.

According to various embodiments, the applying of the first correction scheme to the first division and the applying of the second correction scheme to the second division comprise applying a third correction scheme with respect to a region surrounding a second object of the first image wherein the region surrounding the first object and the region surrounding the second object are non-overlapping.

According to various embodiments, a non-transitory recording medium has stored therein instructions for executing a method for controlling an electronic device, the method comprising: displaying a first image on a display; selecting, from the first image, region surrounding a first object comprising a first sub-region surrounding a first part of the first object and a second sub-region surrounding a second part of the first object; dividing the first image into a plurality of regions comprising a first division and a second division, disposing the first sub-region surrounding the first part of the first object in the first division, and disposing the second sub-region surrounding the second part of the first object in the second division; applying a first correction scheme to the first division and applying a second correction scheme to the second division; and generating a second image comprising the corrected first division and the corrected second division.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features and advantages of certain exemplary embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
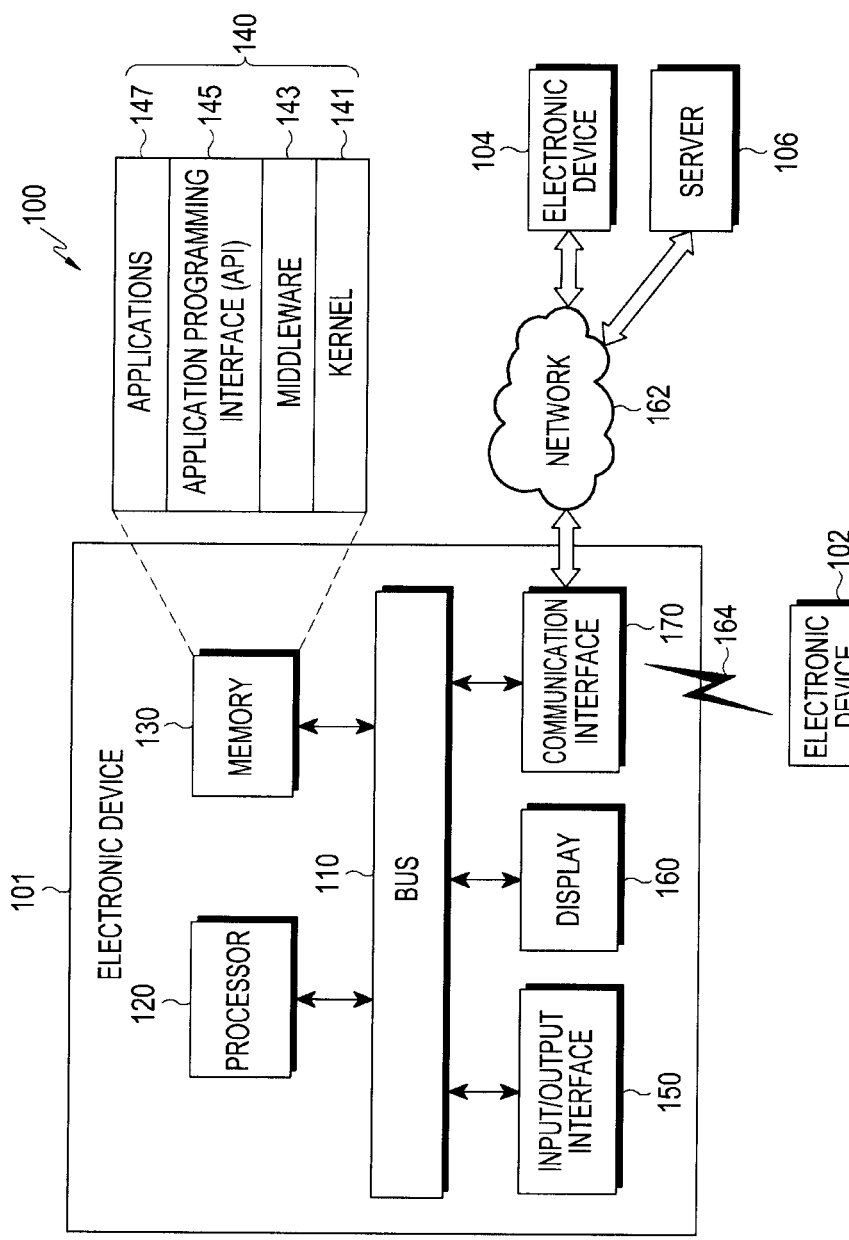
FIG. 1 is a block diagram of an electronic device in a network environment according to various embodiments of the present disclosure.

Hereinafter, various embodiments of the present disclosure will be disclosed with reference to the accompanying drawings. However, embodiments and terms used therein are not intended to limit the present disclosure to particular embodiments, and it should be construed as including various modifications, equivalents, and/or alternatives according to the embodiments of the present disclosure. In regard to the description of the drawings, like reference numerals refer to like elements. The singular forms are intended to include the plural forms as well, unless the context clearly indicates otherwise.

In the present disclosure, an expression such as "A or B," "at least one of A or/and B," or "one or more of A or/and B" may include all possible combinations of together listed items. Expressions such as "first," "second," "primarily," or "secondary," used herein may represent various elements regardless of order and/or importance and do not limit corresponding elements. When it is described that an element (such as a first element) is "operatively or communicatively coupled with/to" or "connected" to another element (such as a second element), the element can be directly connected to the other element or can be connected to the other element through another element (e.g., a third element).

An expression "configured to (or set)" used in the present disclosure may be replaced with, for example, "suitable for," "having the capacity to," "adapted to," "made to," "capable of," or "designed to" according to a situation. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that can perform a corresponding operation by executing at least one software program stored at a memory device.

An electronic device according to various embodiments of the present disclosure may include at least one of, for example, a smartphone, a tablet personal computer (PC), a mobile phone, a video phone, an electronic-book (e-book) reader, a desktop PC, a laptop PC, a netbook computer, a workstation, a server, a personal digital assistant (PDA), a portable multimedia player (PMP), an MP3 player, a mobile medical equipment, a camera, and a wearable device. Examples of the wearable device may include at least one of an accessory type (e.g., a watch, a ring, a bracelet, an anklet, a necklace, glasses, contact lenses, head-mounted device (HMD), and/or the like), a fabric or cloth-integrated type (e.g., electronic clothing, and/or the like), a body-attached type (e.g., a skin pad, a tattoo, and/or the like), a body implanted type (e.g., an implantable circuit, and/or the like), and/or the like. In some embodiments, the electronic device may include, for example, a television (TV), a Digital Video Disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., HomeSync™ of Samsung, TV™ of Apple, or TV™ of Google), a game console, an electronic dictionary, an electronic key, a camcorder, and an electronic frame.

In other embodiments, the electronic device may include at least one of various medical equipment (for example, magnetic resonance angiography (MRA), magnetic resonance imaging (MRI), computed tomography (CT), an imaging device, or an ultrasonic device), a navigation system, a global positioning system (GPS) receiver, an event data recorder (EDR), a flight data recorder (FDR), a vehicle infotainment device, electronic equipment for ships (e.g., a navigation system and gyro compass for ships), avionics, a security device, a vehicle head unit, an industrial or home robot, an automatic teller's machine (ATM), a Point of Sales (POS), Internet of things (e.g., electric bulbs, various sensors, electricity or gas meters, sprinkler devices, fire alarm devices, thermostats, streetlights, toasters, exercise machines, hot-water tanks, heaters, boilers, and/or the like). According to some embodiments, the electronic device may include a part of a furniture, building/structure or a part of a vehicle, an electronic board, an electronic signature receiving device, a projector, and various measuring instruments (e.g., a water, electricity, gas, electric wave measuring device, and/or the like). According to various embodiments, the electronic device may be flexible or may be a combination of two or more of the above-described various devices. The electronic device according to an embodiment of the present disclosure is not limited to the aforementioned devices. Herein, the term "user" used in various embodiments of the present disclosure may refer to a person who uses the electronic device or a device using the electronic device.

The electronic device can provide functions of editing and correcting captured images, such that the users may edit and correct the captured images without using a separate program.

The electronic device may provide various image editing functions. For example, the electronic device may provide functions, e.g., image segmentation or division, image color correction, image size correction, and/or the like. In particular, for a portrait, the electronic device may brighten the color of a face and correct a skin tone to make the skin tone look natural. The electronic device may perform correction with respect to an object that is not photographed frontally by performing perspective transformation on the object, to show a front of the object.

When perspective transformation is performed at a time, distortion may be incompletely corrected due to different directions of body parts (a face, a torso, feet, and/or the like).

Referring to FIG. 1, an electronic device 101 in a network environment 100 according to various embodiments of the present disclosure is disclosed. The electronic device 101 may include a bus 110, a processor 120 (although one is shown, more than one processor 120 can be used), a memory 130, an input/output (I/O) interface 150, a display 160, and a communication interface 170. According to some embodiments, the electronic device 101 may omit at least one of the foregoing elements or may further include other elements.

In certain embodiments, of the electronic device 101 the display 160 can display a first image. One or more processors 120 can be electrically connected to the display 160 and select a region surrounding a first object comprising a first sub-region surrounding a first part of the first object and a second sub-region surrounding a second part of the first object from the first image, apply a first correction scheme to the first sub-region surrounding the first part of the first object, apply a second correction scheme to the second sub-region surrounding the second part of the first object, and generate a second image comprising the corrected first sub-region surrounding the first part of the first object and the corrected second sub-region surrounding the second part of the first object. The bus 110 may include a circuit for connecting, e.g., the elements 110 to 170 and communicating (e.g., a control message or data) between the elements 110 to 170. The processor 120 may include one or more of a central processing unit (CPU), an application processor (AP), and a communication processor (CP). The processor 120 performs operations or data processing for control and/or communication of, for example, at least one other elements of the electronic device 101.

The memory 130 may include a volatile and/or nonvolatile memory. The memory 130 may store, for example, instructions or data associated with at least one other elements of the electronic device 101. According to an embodiment of the present disclosure, the memory 130 may store software and/or a program 140. The program 140 may include at least one of, for example, a kernel 141, middleware 143, an application programming interface (API) 145, and/or an application program (or "application") 147, and the like. At least some of the kernel 141, the middleware 143, and the API 145 may be referred to as an operating system (OS).

The kernel 141 may control or manage, for example, system resources (e.g., the bus 110, the processor 120, the memory 130, and/or the like) used to execute operations or functions implemented in other programs (e.g., the middleware 143, the API 145, or the application program 147). The kernel 141 provides an interface through which the middleware 143, the API 145, or the application program 147 accesses separate components of the electronic device 101 to control or manage the system resources.

The middleware 143 may work as an intermediary for allowing, for example, the API 145 or the application program 147 to exchange data in communication with the kernel 141. In addition, the middleware 143 may process one or more task requests received from the application program 147 based on priorities. For example, the middleware 143 may give a priority for using a system resource (e.g., the bus 110, the processor 120, the memory 130, and/or the like) of the electronic device 101 to at least one of the application programs 147, and may process the one or more task requests.

The API 145 is an interface used for the application program 147 to control a function provided by the kernel 141 or the middleware 143, and may include, for example, at least one interface or function (e.g., an instruction) for file control, window control, image processing or character control. The I/O interface 150 may deliver, for example, an instruction or data input from a user or another external device to other component(s) of the electronic device 101, or output an instruction or data received from other component(s) of the electronic device 101 to a user or another external device.

In certain embodiments, the application program 147 can include instructions that, when executed by one or more processors 120 cause displaying a first image on the display, selecting a region surrounding a first object comprising a first sub-region surrounding a first part of the first object and a second sub-region surrounding a second part of the first object from the first image, applying a first correction scheme to the first sub-region surrounding the first part of the first object, applying a second correction scheme to the second sub-region surrounding the second part of the first object, and generating a second image comprising the corrected first sub-region surrounding the first part of the first object and the corrected second sub-region surrounding the second part of the first object.

Additionally, the middleware 143 can include functions such as the Histogram of Oriented Gradients (HOG) function, Deem Neural Network (DNNs) based body part detection, a skeleton extraction function, and file images of human body parts. The foregoing can be used to detect the presence of items like a face, torso, legs, and feet. Additionally, the middleware 143 can also include image correction schemes such as image size adjustment, rotation, and color correction.

The display 160 may include, for example, a liquid crystal display (LCD), a light emitting diode (LED) display, an organic light emitting diode (OLED) display, a microelectromechanical system (MEMS) display, or an electronic paper display. The display 160 may, for example, display various contents (e.g., a text, an image, video, an icon, and/or a symbol, and/or the like) to users. The display 160 may include a touch screen, and receives a touch, a gesture, proximity, or a hovering input, for example, by using an electronic pen or a part of a body of a user. The communication interface 170 establishes communication between the electronic device 101 and an external device (e.g., the electronic device 102, the electronic device 104, or the server 106). For example, the communication interface 170 may be connected to a network 162 through wireless communication or wired communication to communicate with an external device (e.g., the second external electronic device 104 or the server 106).

The wireless communication may include cellular communication using at least one of Long Term Evolution (LTE), LTE-Advanced (LTE-A), Code Division Multiple Access (CDMA), Wideband CDMA (WCDMA), a Universal Mobile Telecommunication System (UMTS), Wireless Broadband (WiBro), or Global System for Mobile Communications (GSM)). According to an embodiment, the wireless communication may include at least one of Wireless Fidelity (WiFi), Bluetooth, Bluetooth Low Energy (BLE), ZigBee, near field communication (NFC), magnetic secure transmission (MST), radio frequency (RF), and a body area network (BAN).

According to an embodiment, the wireless communication may include GNSS. The GNSS may include, for example, at least one of a global positioning system (GPS), a global navigation satellite system (Glonass), a Beidou navigation satellite system ("Beidou"), and Galileo, the European global satellite-based navigation system. Hereinbelow, "GPS" may be used interchangeably with "GNSS". The wired communication may include, for example, at least one of universal serial bus (USB), high-definition multimedia interface (HDMI), Recommended Standard 232 (RS-232), power line communication, and plain old telephone service (POTS). The network 162 may include a telecommunications network, for example, at least one of a computer network (e.g., a local area network (LAN) or a wide area network (WAN)), Internet, and a telephone network.

Each of the first external electronic device 102 and the second external electronic device 104 may be a device of the same type as or a different type than the electronic device 101. According to various embodiments of the present disclosure, some or all of operations performed by the electronic device 101 may be performed in another electronic device or a plurality of electronic devices (e.g., the electronic device 102 or 104, or the server 106). According to an embodiment of the present disclosure, when the electronic device 101 has to perform a function or a service automatically or at a request, the electronic device 101 may request another device (e.g., the electronic devices 102 or 104 or the server 106) to perform at least some functions associated with the function or the service instead of or in addition to executing the function or the service.

The another electronic device (e.g., the electronic device 102 or 104 or the server 106) may execute the requested function or additional function and deliver the execution result to the electronic device 101. The electronic device 101 may then process or further process the received result to provide the requested function or service. To this end, for example, cloud computing, distributed computing, or client-server computing may be used.

Figure 2:
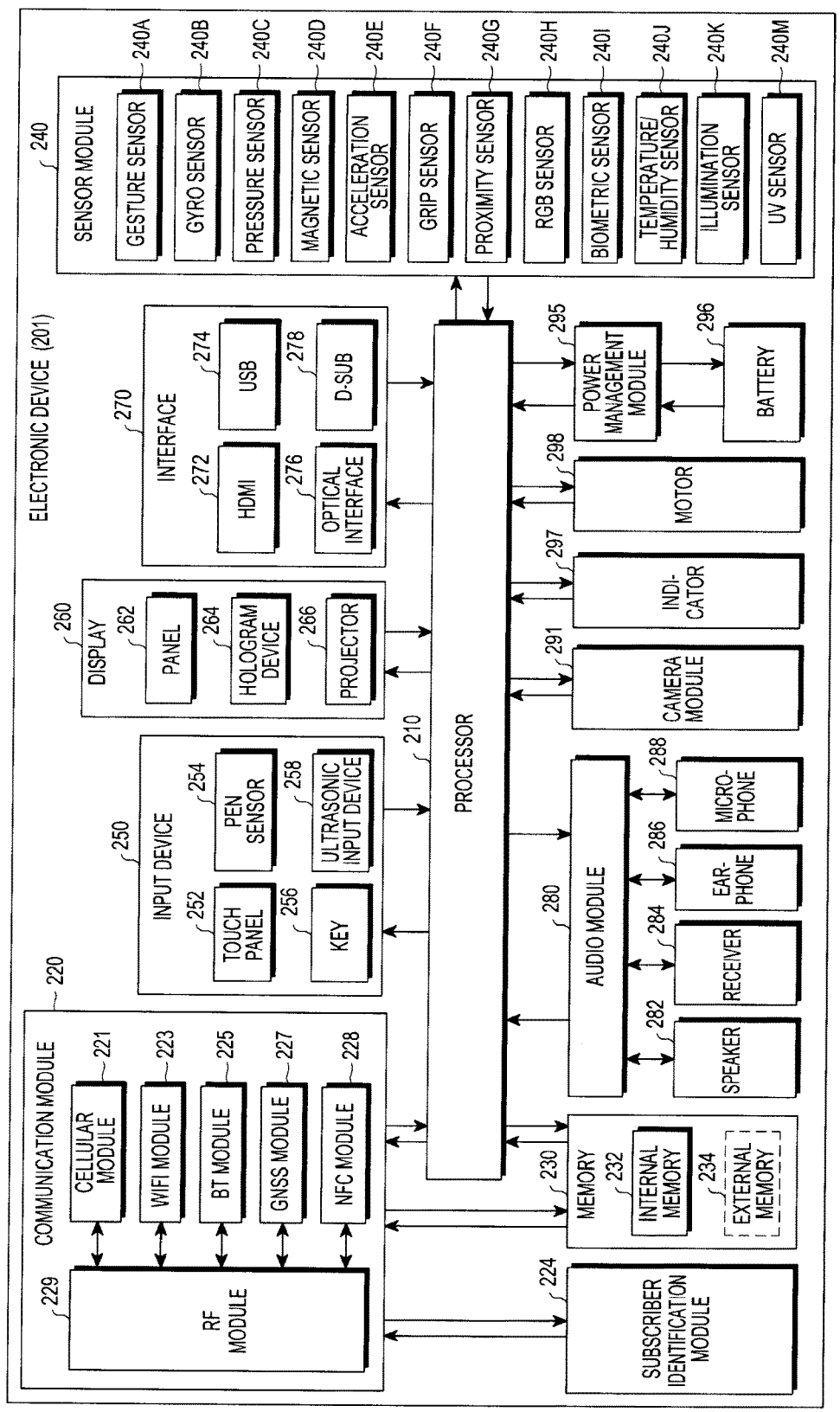
FIG. 2 is a block diagram of an electronic device according to various embodiments of the present disclosure.

FIG. 2 is a block diagram of an electronic device 201 according to various embodiments of the present disclosure. The electronic device 201 may form the entire electronic device 101 illustrated in FIG. 1 or a part of the electronic device 101 illustrated in FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 controls multiple hardware or software components connected to the processor 210 by driving an Operating System (OS) or an application program, and performs processing and operations with respect to various data. The processor 210 may be implemented with, for example, a system on chip (SoC).

According to an embodiment of the present disclosure, the processor 210 may include a GPU and/or an image signal processor. The processor 210 may include at least some of the elements illustrated in FIG. 2 (e.g., the cellular module 221). The processor 210 loads an instruction or data received from at least one of other elements (e.g., a non-volatile memory) into a volatile memory to process the instruction or data, and stores result data in the non-volatile memory.

The communication module 220 may have a configuration that is the same as or similar to the communication interface 170. The communication module 220 may include, for example, the cellular module 221, a WiFi module 223, a Bluetooth (BT) module 225, a GNSS module 227, a near field communication (NFC) module 228, and a radio frequency (RF) module 229. The cellular module 221 may provide, for example, a voice call, a video call, a text service, or an Internet service over a communication network.

According to an embodiment, the cellular module 221 identifies and authenticates the electronic device 201 in a communication network by using the SIM 224 (e.g., a SIM card). According to an embodiment, the cellular module 221 performs at least one of functions that may be provided by the processor 210. According to an embodiment, the cellular module 221 may include a communication processor (CP).

According to some embodiment, at least some (e.g., two or more) of the cellular module 221, the WiFi module 223, the BT module 225, the GNSS module 227, and the NFC module 228 may be included in one integrated chip (IC) or IC package. The RF module 229 may, for example, transmit and receive a communication signal (e.g., an RF signal). The RF module 229 may include a transceiver, a power amp module (PAM), a frequency filter, a low noise amplifier (LNA), or an antenna. According to another embodiment, at least one of the cellular module 221, the WiFi module 223, the BT module 225, the GNSS module 227, and the NFC module 228 may transmit and receive an RF signal through the separate RF module. The SIM 224 may, for example, include a card including an SIM or an embedded SIM, and may include unique identification information (e.g., an integrated circuit card identifier (ICCID) or subscriber information (e.g., an international mobile subscriber identity (IMSI)).

The memory 230 (e.g., the memory 130) may, for example, include an internal memory 232 and/or an external memory 234. The internal memory 232 may, for example, include at least one of a volatile memory (e.g., dynamic random access memory (DRAM), static RAM (SRAM), synchronous dynamic RAM (SDRAM), and/or the like), and a non-volatile memory (e.g., one time programmable read only memory (OTPROM), programmable ROM (PROM), erasable and programmable ROM (EPROM), electrically erasable and programmable ROM (EEPROM), and/or the like), mask ROM, flash ROM, a flash memory, and a solid state drive (SSD). The external memory 234 may further include flash drive, for example, compact flash (CF), secure digital (SD), micro-SD, mini-SD, extreme Digital (xD), a multi-media card (MMC), or a memory stick. The external memory 234 may be functionally or physically connected with the electronic device 201 through various interfaces.

The sensor module 240 measures physical quantity or senses an operation state of the electronic device 201 to convert the measured or sensed information into an electric signal. The sensor module 240 may, for example, include at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., RGB sensor), a biometric sensor 240I, a temperature/humidity sensor 240J, an illumination sensor 240K, and a ultraviolet (UV) sensor 240M. Additionally or alternatively, the sensor module 240 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, and/or a fingerprint sensor. The sensor module 240 may further include a control circuit for controlling at least one sensor included therein. In some embodiment, the electronic device 201 may further include a processor configured to control the sensor module 240 as part of or separately from the processor 210, to control the sensor module 240 during a sleep state of the processor 210.

The input device 250 may include, for example, a touch panel 252, a (digital) pen sensor 254, a key 256, or an ultrasonic input device 258. The touch panel 252 may use at least one of a capacitive type, a resistive type, an IR type, or an ultrasonic type. The touch panel 252 may further include a control circuit.

The touch panel 252 may further include a tactile layer to provide tactile reaction to the user. The (digital) pen sensor 254 may include a recognition sheet which is a part of the touch panel 252 or a separate recognition sheet. The key 256 may also include a physical button, an optical key, or a keypad. The ultrasonic input device 258 senses ultrasonic waves generated by an input means through a microphone (e.g., the microphone 288) and checks data corresponding to the sensed ultrasonic waves.

The display 260 (e.g., the display 160) may include a panel 262, a hologram device 264, a projector 266, and/or a control circuit for controlling them. The panel 262 may be implemented to be flexible, transparent, or wearable. The panel 262 may be configured with the touch panel 252 in one module.

According to an embodiment, the panel 262 may include a pressure sensor (or a "force sensor", interchangeably used hereinafter) capable of measuring a strength of a pressure by a user's touch. The pressure sensor may be implemented integrally with the touch panel 252 or may be implemented as one or more sensors separate from the touch panel 252. The hologram device 264 shows a stereoscopic image in the air by using interference of light. The projector 266 displays an image onto an external screen through projection of light. The screen may be positioned inside or outside the electronic device 201.

According to an embodiment, the interface 270 may include a high-definition multimedia interface (HDMI) 272, a universal serial bus (USB) 274, an optical interface 276, or a D-subminiature 278. The interface 270 may be included in the communication interface 170 illustrated in FIG. 1. Additionally or alternatively, the interface 270 may include, for example, an MHL interface, an SD card/MMC interface, or an infrared data association (IrDA) interface.

The audio module 280 bi-directionally converts sound and an electric signal. At least one element of the audio module 280 may be included in the input/output interface 150 illustrated in FIG. 1. The audio module 280 processes sound information input or output through the speaker 282, the receiver 284, the earphone 286, or the microphone 288.

The camera module 291 is, for example, a device capable of capturing a still image or a moving image, and according to an embodiment, may include one or more image sensors (e.g., a front sensor or a rear sensor), a lens, an image signal processor (ISP), or a flash (e.g., an LED, a xenon lamp, and/or the like). The power management module 295 manages power of the electronic device 201. According to an embodiment, the power management module 295 may include a power management integrated circuit (PMIC), a charger IC, or a battery fuel gauge. The PMIC may have a wired and/or wireless charging scheme. The wireless charging scheme includes a magnetic-resonance type, a magnetic induction type, and an electromagnetic type, and for wireless charging, an additional circuit, for example, a coil loop, a resonance circuit, or a rectifier may be further included. The battery gauge measures the remaining capacity of the battery 296 or the voltage, current, or temperature of the battery 296 during charging. The battery 296 may include a rechargeable battery and/or a solar battery.

The indicator 297 displays a particular state, for example, a booting state, a message state, or a charging state, of the electronic device 201 or a part thereof (e.g., the processor 210). The motor 298 converts an electric signal into mechanical vibration or generates vibration or a haptic effect. The electronic device 201 may include a device for supporting the mobile TV (e.g., a GPU) to process media data according to a standard such as digital multimedia broadcasting (DMB), digital video broadcasting (DVB), or mediaFlo™. Each of the foregoing elements described herein may be configured with one or more components, names of which may vary with a type of the electronic device. In various embodiments, some components of the electronic device (e.g., the electronic device 201) may be omitted or may further include other elements, and some of the components may be coupled to form one entity and identically perform functions of the components before being coupled.

Figure 3:
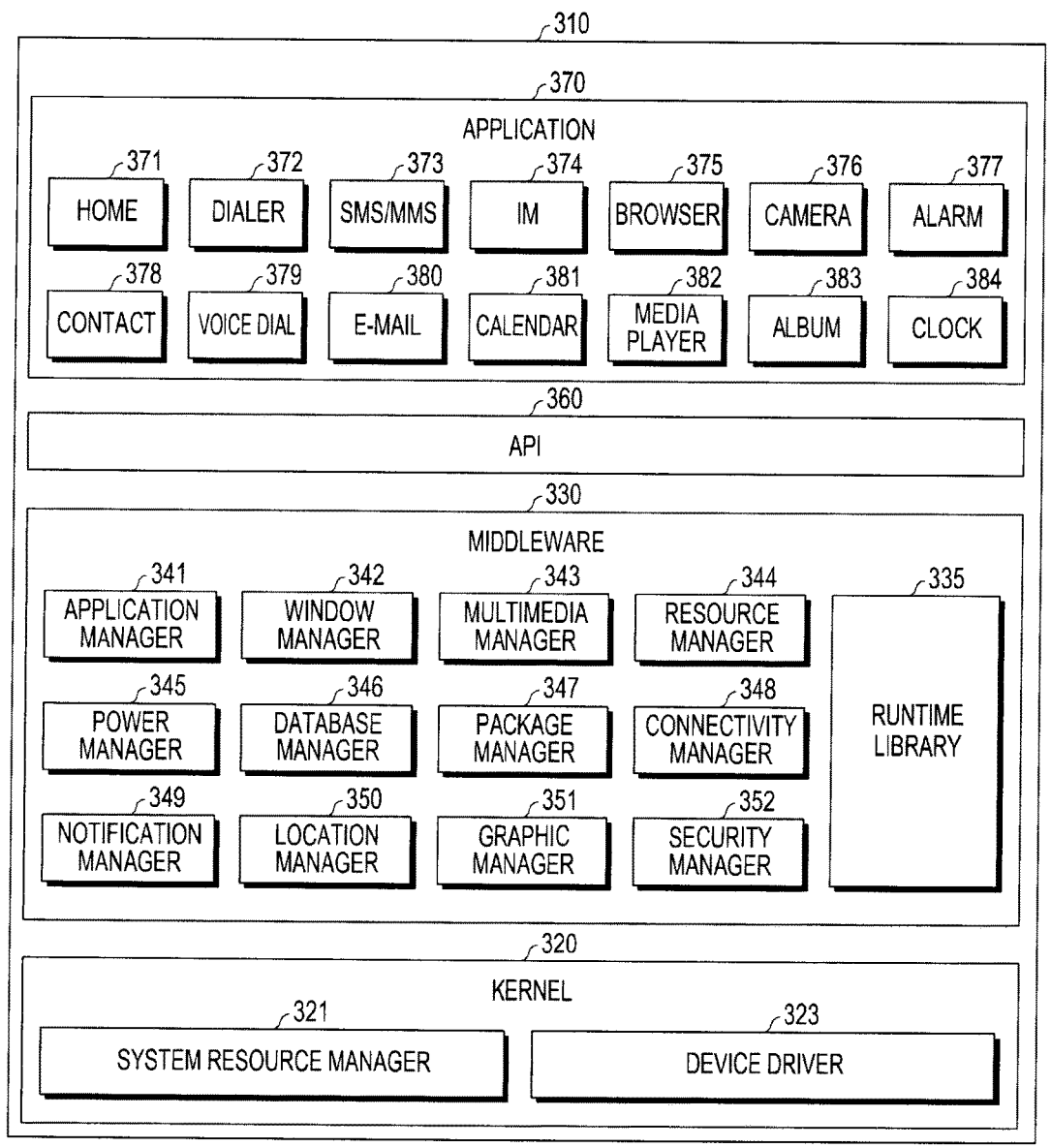
FIG. 3 is a block diagram of a programming module according to various embodiments of the present disclosure.

FIG. 3 is a block diagram of a programming module according to various embodiments of the present disclosure. According to an embodiment, a programming module 310 (e.g., the program 140) may include an OS for controlling resources associated with an electronic device (e.g., the electronic device 101) and/or various applications (e.g., the application program 147) executed on the OS. The OS may include Android™, iOS™, Windows™, Symbian™, Tizen™, or Bada™ Referring to FIG. 3, the programming module 310 may include a kernel 320 (e.g., the kernel 141), middleware 330 (e.g., the middleware 143), an application programming interface (API) 360 (e.g., the API 145), and/or an application 370 (e.g., the application program 147). At least a part of the programming module 310 may be preloaded on an electronic device or may be downloaded from an external device (e.g., the vehicle device 102, the electronic device 104, or the server 106).

The kernel 320 may include a system resource manager 321 and/or a device driver 323. The system resource manager 321 may perform control, allocation, retrieval of system resources, and/or the like.

According to an embodiment, the system resource manager 321 may include a process management unit, a memory management unit, or a file system management unit. The device driver 323 may include, for example, a display driver, a camera driver, a Bluetooth driver, a shared memory driver, a USB driver, a keypad driver, a WiFi driver, an audio driver, or an inter-process communication (IPC) driver. The middleware 330 may include provide functions that the application 370 commonly requires or provide various functions to the application 370 through the API 360 to allow the application 370 to use a limited system resource in an electronic device.

According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses to add a new function through a programming language while the application 370 is executed. The runtime library 335 performs input/output management, memory management, or calculation function processing. The application manager 341 manages a life cycle of the applications 370.

The runtime library 335 can include functions such as the Histogram of Oriented Gradients (HOG) function, Deem Neural Network (DNNs) based body part detection, a skeleton extraction function, and file images of human body parts. The foregoing can be used to detect the presence of items like a face, torso, legs, and feet. Additionally, the middleware 143 can also include image correction schemes such as image size adjustment, rotation, and color correction.

The window manager 342 manages a GUI resource used in a screen. The multimedia manager 343 recognizes a format necessary for playing media files and performs encoding or decoding on a media file by using a codec appropriate for a corresponding format. The resource manager 344 manages a source code or a memory space of the applications 370. The power manager 345 manages a battery or power and provides power information necessary for an operation of the electronic device. According to an embodiment, the power manager 345 may operate with basic input/output system (BIOS). The database manager 346 generates, searches or changes a database used for at least one application among the applications 370. The package manager 347 manages the installation or update of an application distributed in a package file format.

The connectivity manager 348 manages a wireless connection. The notification manager 349 provides an event, e.g., an arriving message, an appointment, proximity notification, and/or the like. The location manager 350 manages location information of an electronic device. The graphic manager 351 manages a graphic effect to be provided to a user or a user interface relating thereto. The security manager 352 provides system security or user authentication.

According to an embodiment, the middleware 330 may further include a telephony manager for managing a voice or video call function of the electronic device or a middleware module forming a combination of functions of the above-described components. According to an embodiment, the middleware 330 provides a module specified for each type of an OS. Additionally, the middleware 330 may delete some of existing elements or add new elements dynamically. The API 360 may be provided as a set of API programming functions with a different configuration according to the OS. In the case of Android or iOS, for example, one API set may be provided by each platform, and in the case of Tizen, two or more API sets may be provided.

The application 370 may include one or more applications capable of providing a function, for example, a home application 371, a dialer application 372, a short messaging service/multimedia messaging service (SMS/MMS) application 373, an instant message (IM) application 374, a browser application 375, a camera application 376, an alarm application 377, a contact application 378, a voice dial application 379, an e-mail application 380, a calendar application 381, a media player application 382, an album application 383, a clock application 384, a health care application (e.g., an application for measuring an exercise amount, a blood sugar, and/or the like), or an environment information providing application (e.g., an application for providing air pressure, humidity, or temperature information or the like).

According to an embodiment, the application 370 may include an information exchange application supporting information exchange between the electronic device and an external electronic device. The information exchange application may include, for example, a notification relay application for transferring specific information to the external electronic device or a device management application for managing the external electronic device. For example, the notification relay application may deliver notification information generated in another application of the electronic device to an external electronic device or may receive notification information from the external electronic device and provide the notification information to the user.

The device management application may manage (e.g., install, remove, or update) a function (e.g., turn on/turn off of an external electronic device itself (or a part thereof) or control of brightness (or resolution) of a display) of an external device communicating with the electronic device, a service provided by an application operating in an external electronic device or provided by the external electronic device (e.g., a call service or a message service). According to an embodiment, the application 370 may include an application (e.g., device health care application of mobile medical equipment) designated according to an attribute of the external electronic device. According to an embodiment, the application 370 may include an application received from the external electronic device. The at least a part of the programming module 310 may be implemented (e.g., executed) by software, firmware, hardware (e.g., the processor 210), or a combination of two or more of them, and may include, for example, modules, programs, routines, sets of instructions, or processes for performing one or more functions.

Figure 4:
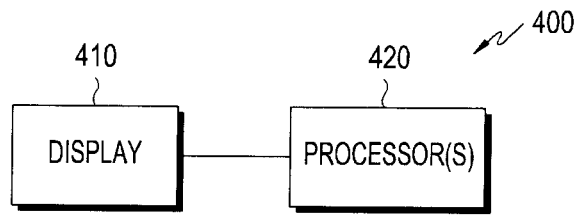
FIG. 4 is a block diagram of an electronic device according to an embodiment of the present disclosure.

FIG. 4 is a block diagram of an electronic device 400 according to an embodiment of the present disclosure. The electronic device 400 illustrated in FIG. 4 may include or substitute for the electronic device 101 illustrated in FIG. 1 or the electronic device 201 illustrated in FIG. 2.

Referring to FIG. 4, the electronic device 400 may include a display 410 and one or more processor(s) 420. The electronic device 400 according to various embodiments may be implemented to more or less elements than those illustrated in FIG. 4. For example, the electronic device 400 may include input modules (e.g., a touch panel, a hard key, a proximity sensor, a biometric sensor, and/or the like), a power supply unit, a memory, and/or the like.

According to various embodiments, the display 410 may include the display 160 illustrated in FIG. 1 and the display 260 illustrated in FIG. 2. The display 410 may display various contents. The contents may include, for example, images, characters, icons, and/or the like. The display 410 may display contents stored in a memory (not shown) and displays an image input through an imaging sensor (not shown). The display 410 may display the contents stored in the memory on a display region thereof and the image input through the imaging sensor on the other region thereof.

According to various embodiments, the display 410 may be implemented integrally with a touch panel (not shown) to receive a touch input from an external source. Thus, a user may control a user interface displayed on the display 410 using a touch, drag input, and/or the like.

The processor 420 may control operations of the electronic device 400 and/or a signal flow between elements of the electronic device 400, and perform data processing. For example, the processor 420 may include a central processing unit (CPU), an application processor (AP), a micro control unit (MCU), a micro processor unit (MPU), and/or the like. The processor 420 may include a single-core processor or a multi-core processor.

According to various embodiments, the display 410 may display a first image. The processor 420 may select a region including first and second sub-regions of the first image. Alternatively, the processor 420 may select a region surrounding a first object in the first image, including a first sub-region surrounding a first part of the first object and a second sub-region surrounding a second part of the first object. The processor 420 may apply a first correction scheme to the first sub-region and a second correction scheme to the second sub-region. The processor 420 may generate a second image including a corrected first sub-region and a corrected second sub-region.

Figure 5:
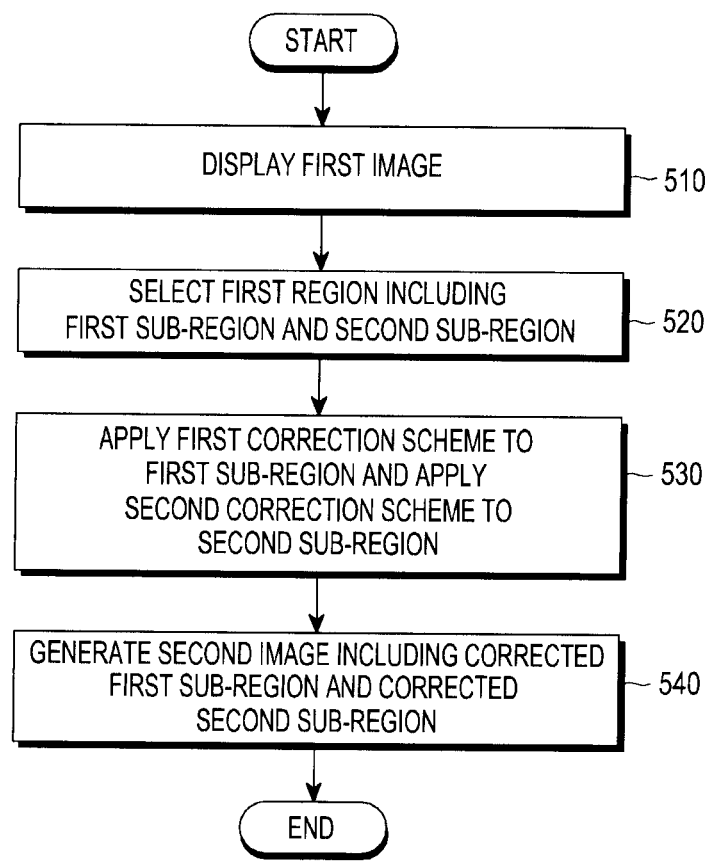
FIG. 5 is a flowchart of a process of correcting an image displayed on a display using a plurality of correction schemes in an electronic device according to various embodiments of the present disclosure.

FIG. 5 is a flowchart of a process of correcting an image displayed on a display using a plurality of correction schemes in an electronic device according to various embodiments of the present disclosure.

In operation 510, the electronic device 101 may display a first image on a display. The electronic device 101 reads image data previously stored in a memory (not shown) to display the first image. Alternatively, the electronic device 101 displays the first image using an image signal input through an imaging sensor (not shown).

In operation 520, the electronic device 101 may select, from the first image, a first region including a first sub-region and a second sub-region. For example, if an object is a human, the first region may be a region in the first image surrounding the area where the human or other object is situated. For purposes of this document, "surrounding an object" shall be meant to mean a part of the image inside a shape that is sized to contain the object and shall be constructed to include the object. In this case, the electronic device 101 may select a sub-region surrounding a part of the object, e.g., a face of the human, as the first sub-region and a region excluding the face as the second partial region from the first region. However, the present disclosure is not limited to this example. For example, the electronic device 101 may select a sub-region surrounding feet as well as a face as the first sub-region and a region excluding the face and the feet as the second sub-region. Alternatively, the second sub-region can include another part of the human or other object, such as the torso and thighs. The term "part of an/the object" shall be understood to mean another discrete object that forms part of the object, such the face, torso and thighs, and feet which form parts of the human.

According to various embodiments, if detecting a human in the first image, the electronic device 101 may detect human body parts, e.g., arms, legs, a torso, a face, and/or the like, by using a histogram of oriented gradient (HOG) algorithm and a linear classification scheme or by modifying deep neural networks (DNNs)-based body part detection, a skeleton extraction algorithm, and/or the like.

When a human is detected from the first image using the HOG algorithm and the linear classification scheme, the electronic device 101 may transform the first image into an HOG image that is an image displayed with an edge component by emphasis on a contrast component of the image. The electronic device 101 may search for and detect a human body from the HOG image by using a patch having a horizontal-vertical ratio learned for each body.

For example, the electronic device 101 may detect a human face from the HOG image by using a patch having a horizontal-vertical ratio optimized for the face and a pattern similar to a shape of the face. More specifically, the electronic device 101 may scan the entire HOG image in the first image by using a patch similar to the shape of the face. In this process, the electronic device 101 may distinguish a region having a high similarity with respect to the patch from a region having a low similarity with respect to the patch to find the human face. Likewise, the electronic device 101 may detect a human foot from the HOG image by using a horizontal-vertical ratio optimized for the human foot and a patch having a pattern similar to the foot.

In this case, the electronic device 101 may detect human body parts, taking into statistical account a position relationship between the human body parts. For example, when a human stands, human body parts are connected in such a way that a head, a waist, and feet are at top, middle, and bottom of the body, respectively, and thus the electronic device 101 may exclude an erroneous detection result such as the waist-head-feet order by using the patch, thereby improving the accuracy of detection.

When the human is detected from the first image by using the DNNs-based body part detection and the skeleton extraction algorithm, the electronic device 101 may determine a simple model such as an edge or a point of an input image and then determine a joint, a body part, and/or the like, which are complex models where simple models are combined. Thus, the electronic device 101 may detect body parts of a human photographed in various poses from the first image.

According to various embodiments, the electronic device 101 may detect a human and a body part of the human by using the HOG algorithm and the linear classification scheme or the DNNs-based body part detection and the skeleton extraction algorithm or by using them in a sequential or parallel manner.

According to various embodiments, the electronic device 101 may select the first sub-region based on a signal from an external source. For example, the user may touch a region desired as the first sub-region or drag in the form of a closed curve and select an inner region of the closed curve on the first image displayed on a touch-type display.

In operation 530, the electronic device 101 may apply the first correction scheme to the first sub-region and the second correction scheme to the second sub-region.

According to various embodiments, the electronic device 101 may calculate a ratio of the first sub-region and/or a ratio of the second sub-region to the first region or the region surrounding the object selected in operation 520.

For example, if the first region or the region surrounding the object corresponds to a region surrounding the human body and the first sub-region corresponds to the area surrounding a human face, the electronic device 101 may calculate a ratio of the face to a total length of the detected human body. In this case, the electronic device 101 may compare a preset ideal ratio of a face to a height of a human with the calculated ratio for the first region or the region surrounding the human. The electronic device 101 may calculate a correction ratio for the first region or the region surrounding the human based on the comparison result.

According to various embodiments, the electronic device 101 may perform image correction to adjust the detected ratio of the face to the human body to a preset ratio. There may be various ways to do image correction. For example, the electronic device 101 may use various image correction schemes such as image size adjustment, perspective transformation, rotation, color correction, and/or the like.

According to various embodiments, the electronic device 101 may apply a plurality of correction schemes to one image. For example, the electronic device 101 may apply different correction schemes to the first sub-region and the second sub-region, respectively. That is, the electronic device 101 may apply image size adjustment to the first sub-region and perspective transformation to the second sub-region.

According to various embodiments, if the first region or the region surrounding the object corresponds to a human body, the electronic device 101 may set the area surrounding a face region and feet (or foot) region as the first sub-region and reduces the size of the first sub-region, and set an area surrounding a torso and thighs region as the second sub-region and apply perspective transformation to the second sub-region in such a way that an upper part of the torso and thighs looks shorter and farther away than before and a lower part of the torso and thighs looks longer and nearer than before, thereby adjust an overall ratio.

In operation 540, the processor 120 may generate the second image including the corrected first sub-region and the corrected second sub-region.

According to various embodiments, the electronic device 101 may generate the corrected first region or the corrected region surrounding the object by combining the corrected first sub-region and the corrected second sub-region. The electronic device 101 may change the first region or the region surrounding the object in the first image into the corrected first image. In this case, the electronic device 101 may perform additional correction not to prevent a coupled portion between the corrected first region or the corrected region surrounding the object and a remaining part of the existing first image from looking unnatural. For example, if the size of the first sub-region is reduced, the electronic device 101 may reduce the size of the remaining part of the first image, which meets the first sub-region.

In this way, the processor 120 may generate the second image including the corrected first sub-region and the corrected second sub-region.

Figure 6A:
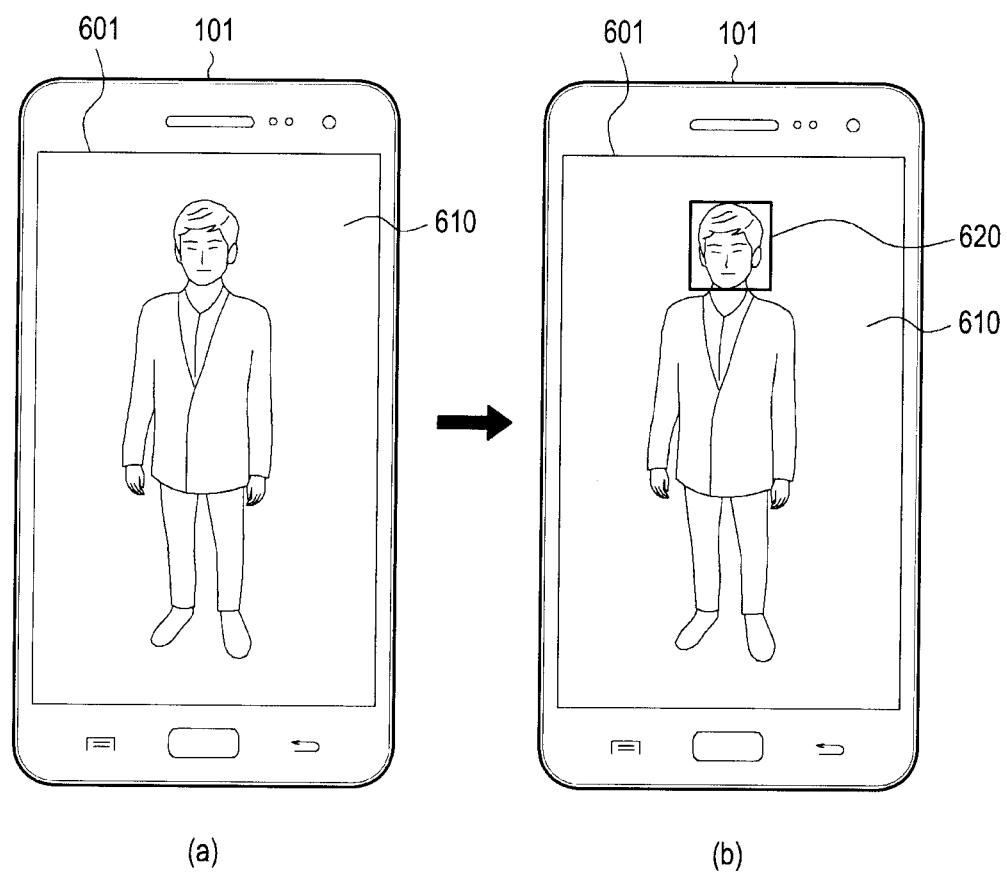
FIG. 6A and FIG. 6B illustrate a situation where an electronic device detects body parts of a person in an input image, according to various embodiments of the present disclosure.
Figure 6B:
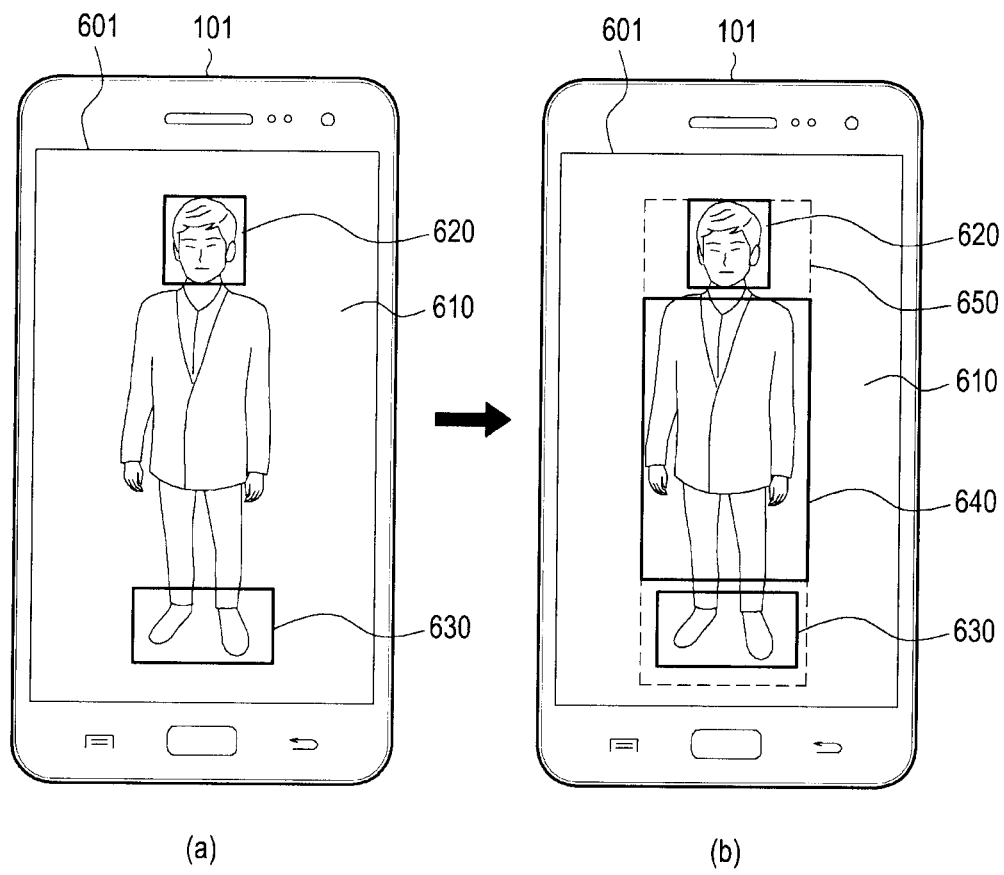

FIGS. 6A and 6B illustrate a situation where an electronic device may detect body parts of a person in an input image, according to various embodiments of the present disclosure.

Referring to (a) of FIG. 6A, the electronic device 101 may display a first image 610 on the display 601. According to various embodiments, the electronic device 101 may process an image signal input through the imaging sensor (not shown) and displays the first image 610. Alternatively, the electronic device 101 may read image data previously stored in the memory (not shown) and display the read image data as the first image 610 on the display 601.

Referring to (b) of FIG. 6A, the electronic device 101 may detect a sub-region surrounding the face (or face sub-region) 620 from the first image 610. The electronic device 101 may detect the face sub-region 620, for example, by using the HOG algorithm and the linear classification scheme.

More specifically, the electronic device 101 may convert the first image 610 into an HOG image having an emphasized contrast component. The electronic device 101 may scan the HOG image by using a rectangular patch having a pattern similar to the shape of a human face. The rectangular patch may have a horizontal-vertical ratio corresponding to the shape of the human face.

According to various embodiments, the electronic device 101 may search for a part having a high similarity with a face shape included in the rectangular patch while scanning the HOG image using the rectangular patch. The electronic device 101 may perform scanning while changing the size of the HOG image to improve a face detection probability. The electronic device 101 may detect a top-bottom direction of the face during face detection. The electronic device 101 may reduce a time for detection of another body part using, for example, the detected top-bottom direction of the face.

Referring to (a) of FIG. 6B, the electronic device 101 may detect a sub-region that surrounds feet (feet sub-region) 630 from the first image 610. The electronic device 101 may detect the feet sub-region 630 by using the HOG algorithm and the linear classification scheme. The electronic device 101 may search for a part having a high similarity with a foot shape included in the rectangular patch while scanning the HOG image using the rectangular patch.

According to various embodiments, the electronic device 101 may improve a foot detection probability and reduce a time for the detection by using a position of the previously detected face. For example, it is highly likely that the foot is under the face, the electronic device 101 may preferentially scan a region under the face. In certain embodiments, the electronic device 101 can detect the human body against a background. Thus, the feet are likely to be at end of the body, opposite the head.

Referring to (b) of FIG. 6B, the electronic device 101 may detect a region surrounding a torso and thighs (or torso and thighs sub-region) 640 from the first image 610. The electronic device 101 may detect the torso and thighs sub-region 640 by using the HOG algorithm and the linear classification scheme. The electronic device 101 searches for a part having a high similarity with a torso and thighs shape included in the rectangular patch while scanning the HOG image using the rectangular patch.

According to various embodiments, the electronic device 101 may improve a detection probability of a position of the feet sub-region 630 or the torso and thighs sub-region 640 and reduces a time for the detection by using the position of the previously detected face sub-region 620. For example, it is generally highly probable that the torso and thighs are under a face and the feet are under the torso and thighs, the electronic device 101 first scans a region under the face sub-region 620 to search for the torso and thighs sub-region 640 and then scans a region under the detected torso and thighs sub-region 640 to search for the feet region sub-region 630. Alternatively, the electronic device 101 can detect the face sub-region 620, and detect the feet sub-region 630 by scanning the opposite end of the body. The electronic device 101 can detect the torso and thighs by scanning the area between the face sub-region 620 and the feet sub-region 630.

In the above-described way shown in FIGS. 6A and 6B, the electronic device 101 may detect the first sub-region (e.g., the face sub-region 620 and the feet sub-region 630) and the second partial region (e.g., the torso and thighs sub-region 640), and the region surrounding the object (e.g., the entire body 650) including the first sub-region (e.g., the face sub-region 620 and the feet sub-region 630) and the second sub-region (e.g., the torso and thighs sub-region 640).

According to various embodiments, the electronic device 101 may calculate a ratio of the first sub-region and/or a ratio of the second sub-region to the first image. For example, the electronic device 101 may calculate a ratio of the face sub-region 620 to the detected region surrounding the entire body 650 and/or a ratio of the feet sub-region 630 to the detected region surrounding the entire body 650.

If the ratio of the detected face sub-region 620 to the detected region surrounding the entire body 650 is high, the electronic device 101 may set a correction level in such a way that the size of the face may have an ideal ratio with respect to the length of the entire body. The electronic device 101 may adjust the size of the detected face sub-region 620, the torso and thighs sub-region 640, and/or the feet sub-region 630, and/or the like, for ratio adjustment.

For example, the electronic device 101 may calculate a ratio of the length of the detected entire body 650 to the length of the detected face sub-region 620 as 6:1. In this case, the electronic device 101 may adjust the calculated ratio of the length of the detected entire body 650 to the length of the detected face sub-region 620 to an ideal ratio of the length of the body to the length of the face, e.g., 8:1. To this end, the electronic device 101 may reduce the length or size of the detected face sub-region 620 and increase the length or size of the detected torso and thighs sub-region 640.

A detailed way for the electronic device 101 to adjust the detected body ratio will be described later.

Figure 7A:
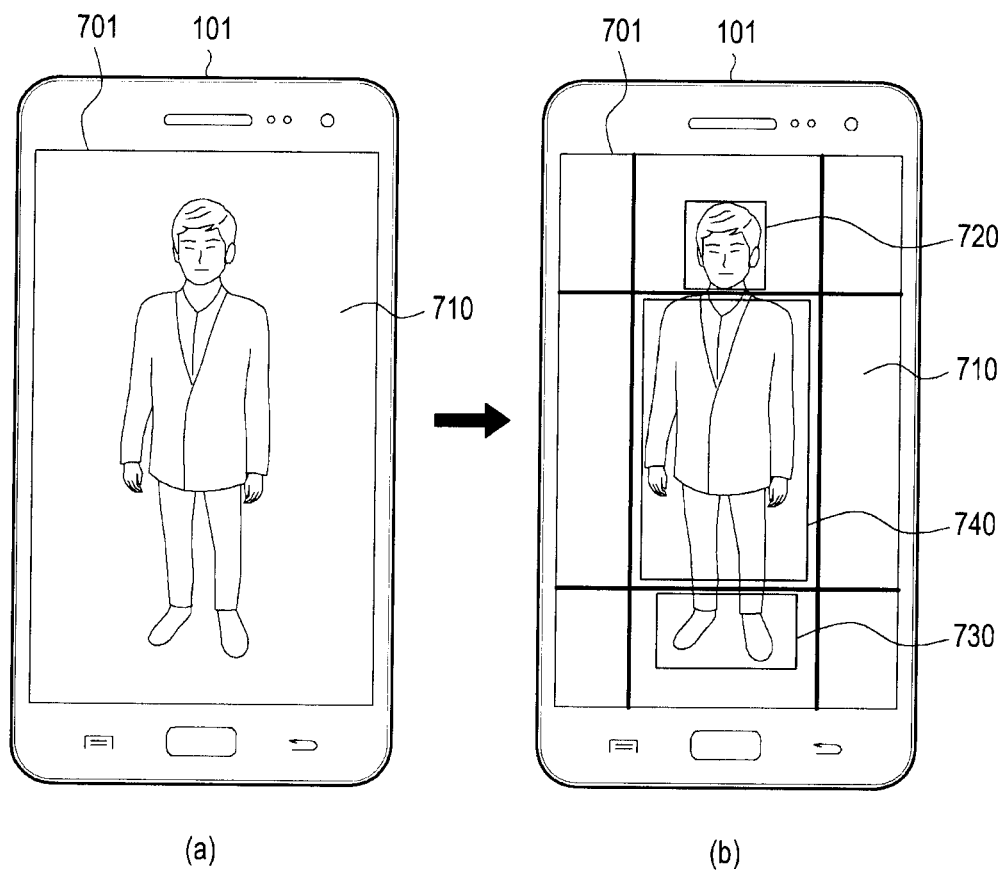
FIG. 7A and FIG. 7B illustrate a process in which an electronic device corrects detected body parts according to various embodiments of the present disclosure.
Figure 7B:
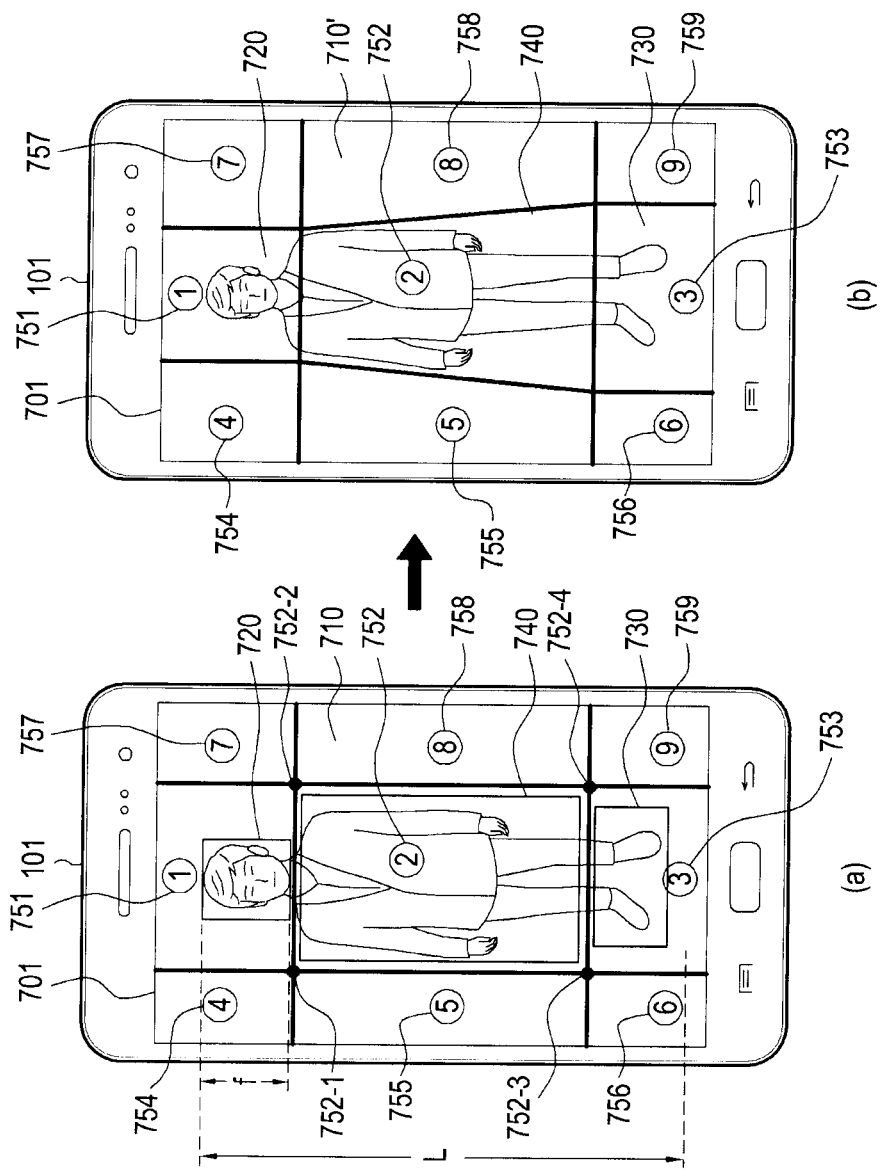

FIGS. 7A and 7B illustrate a process in which an electronic device corrects detected body parts according to various embodiments of the present disclosure.

Referring to (a) of FIG. 7A, the electronic device 101 may display a first image 710 on a display 701. According to various embodiments, the electronic device 101 may processe an image signal input through the imaging sensor (not shown) and displays the first image 710. Alternatively, the electronic device 101 may read image data previously stored in the memory (not shown) and display the read image data on the display 701.

Referring to (b) of FIG. 7A, the electronic device 101 may detect a first sub-region (e.g., a face sub-region 720 and feet sub-region 730) and a second partial region (e.g., a torso and thighs 740) by using the way described in detail with reference to FIGS. 6A and 6B. The electronic device 101 may divide the first image 710 based on the detected first sub-region (e.g., the face sub-region 720 and the feet sub-region 730) and the detected second sub-region (e.g., the torso and thighs sub-region 740). The electronic device 101 may divide the first image 710 such that the first sub-region (e.g., the face sub-region 720 and the feet sub-region 730) and the second sub-region (e.g., the torso and thighs sub-region 740) belong to different divisions.

Referring to (a) of FIG. 7B, the electronic device 101 may divide the first image 710 into nine divisions. As described above in detail, division of the first image 710 may be performed based on the detected sub-regions 720, 730, and 740. The electronic device 101 may divide the first image 710 such that the detected face 720 belongs to a first division 751. The electronic device 101 may divide the first image 710 such that the detected torso and thighs sub-region 740 belongs to a second division 752 and the detected feet sub-region 730 belongs to a third division 753.

However, the present disclosure is not limited to this example. There may be various ways for the electronic device 101 to divide the detected sub-regions 720, 730, and 740 and the first image 710. For example, the electronic device 101 may divide the first image 710 into three columns of four rows of divisions. The rows can be divided at the neck, waist, and top of the feet (ankles). The columns can be divided at the left and right of the torso. Thus, the detected face belongs to a division that is located at the top of the second column, the torso can be located in the division in the second row of the second column, the thighs can be located in the division in the third row of the second column, and the feet can be located in the division in the fourth row of the second column. The electronic device 101 may also divide the first image 710 using two rows, such that the detected face 720 and torso and thighs 740 belong to the top division in the second column and the detected feet 730 belongs to the bottom division region in the second column. In the following examples, reference is made to the three columns with three rows depicted in FIG. 7B (a).

According to various embodiments, the electronic device 101 may calculate a ratio of the face sub-region 720 to the detected entire body and/or a ratio of the feet sub-region 730 to the detected entire body. If the ratio of the detected face sub-region 720 to the detected entire body is high, the electronic device 101 may set a correction level in such a way that the size of the face may have an ideal ratio with respect to the length of the entire body. The electronic device 101 may adjust the size of the detected face sub-region 720, the torso and thighs sub-region 740, and/or the feet sub-region 730, and/or the like, for ratio adjustment.

For example, the electronic device 101 may calculate a ratio of a length L from the top of the detected face sub-region 720 to the bottom of the detected feet sub-region 730 to a length f (as measured from the top of the head (or the scalp) to the neck) of the detected face sub-region 720 as 6:1. In this case, the electronic device 101 may adjust the calculated ratio of the length of the detected entire body, L, to the length of the detected face sub-region 720, f, to an ideal ratio of the length of the body to the length of the face, e.g., 8:1. However, the present disclosure is not limited to this example. The electronic device 101 may set various ratios to correct the calculated ratio. Referring to (b) of FIG. 7B, the electronic device 101 may correct the divisions 751 through 759 of the first image 710 to adjust the ratio of the body length L to the face length f to a preset ratio. The electronic device 101 may correct the divisions 751 through 759 to correct the detected sub-regions (including 720, 730, and 740) included in the divisions 751 through 759. However, the present disclosure is not limited to this example. For example, the electronic device 101 may correct the detected sub-region 720, 730, and 740 without dividing the first image.

According to various embodiments, the electronic device 101 may reduce the size of the first division 751 to reduce the size of the face sub-region 720, and the length f. The electronic device 101 may perform perspective transformation on the torso and thighs sub-region 740 to adapt to the reduced face size. The electronic device 101 also adjusts the size of the feet region 730 to adapt to the size of a part under the perspective-transformed torso and thighs 740.

Perspective transformation may be one of warping schemes. The electronic device 101 may perform image correction using perspective transformation by calculating a transform matrix with four points on a sub-region to be transformed and four points on a region where a transformed image is to be stored. Thus, the electronic device 101 may obtain coordinates of four vertices 752-1, 752-2, 752-3, and 752-4 of the second division 752 to which the torso and thighs region 740 belongs. The electronic device 101 transforms positions of the upper vertices 752-1 and 752-2 of the second division 752 to adapt to the reduced first division 751.

According to various embodiments, the electronic device 101 may change the size (broadens) of the fourth division 754 and the seventh division 757 to adapt to the size-reduced first division 751. For example, the electronic device 101 may reduce the height (or the vertical side length) of the fourth division 754 to adapt to the height of the first division 751. The electronic device 101 may also change the width (or the horizontal side length) of the fourth division 754 to have the same ratio or original size as the first division 751 or a median ratio thereof. Likewise, the electronic device 101 may change the size of the seventh division 757.

According to various embodiments, the electronic device 101 may correct the fifth division 755 and the eighth division 758 to adapt to the perspective-transformed second division 752. For example, the electronic device 101 may obtain coordinates of four vertices of the fifth division 755. The electronic device 101 may obtain changed coordinates of the vertices of the fifth division 755 and correct the fifth division 755 to adapt to the position of the first vertex 752-1 and the position of the third vertex 752-3 of the perspective-transformed second division 752.

Likewise, the electronic device 101 may obtain coordinates of four vertices of the eighth division 758. The electronic device 101 may obtain changed coordinates of the vertices of the eighth division 758 and correct the eighth division 758 to adapt to the position of the second vertex 752-2 and the position of the fourth vertex 752-4 of the perspective-transformed second division 752.

Through the foregoing process, the electronic device 101 may correct and then combines the divisions 751 through 759, thus generating a second image 710'. In this case, to minimize misalignment in boundaries between the divisions 751 through 759 to be combined, the electronic device 101 may perform additional correction.

As such, the electronic device 101 may correct the ratio of the face sub-region 720 to the entire body to a preset ratio and apply different correction schemes to the first sub-region (e.g., the face sub-region 720) and the second sub-region (e.g., the torso and thighs sub-region 740), thereby generating the more natural-looking second image 710'.

Figure 8:
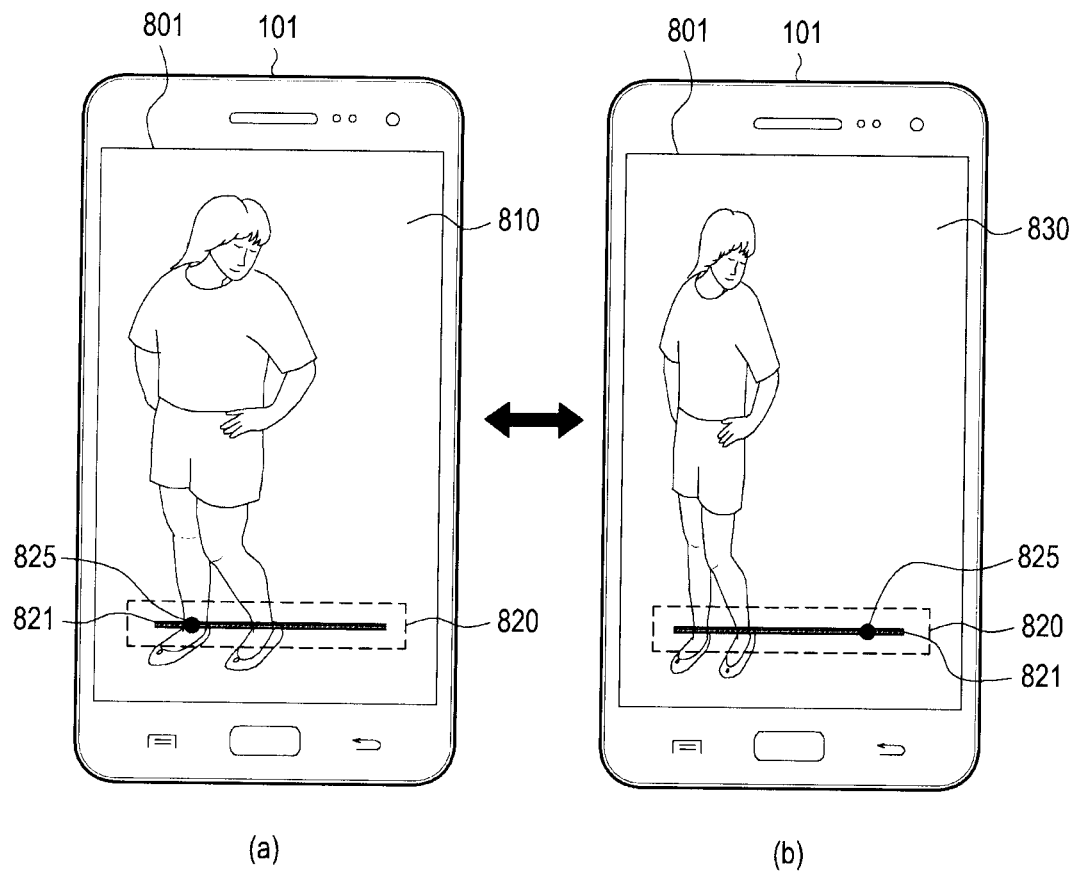
FIG. 8 illustrates a situation where a user interface is adjusted for correction level adjustment in an electronic device according to various embodiments of the present disclosure.

FIG. 8 illustrates a user interface where the correction level can be adjusted in an electronic device according to various embodiments of the present disclosure.

Referring to (a) of FIG. 8, the electronic device 101 may display a first image 810 on a display 801. According to various embodiments, the electronic device 101 may read image data previously stored in the memory (not shown) and displays the first image 810 on the display 801.

According to various embodiments, the electronic device 101 may display a user interface 820 for adjusting a correction level on the display 801. For example, the electronic device 101 may display the user interface 820 including a horizontal bar 821 and an indicating dot 825 movable along the bar 821. However, the form or shape of the user interface 820 is not limited to the foregoing example.

According to various embodiments, based on movement of the indicating dot 825 on the horizontal bar 821, the electronic device 101 may change a level for adjusting the first image 810 to display a second image 830 on the display 801.

For example, if the indicating dot 825 is to the left of the horizontal bar 821, the electronic device 101 may lower the adjustment level for the first image 810 and display the second image 830. If the indicating dot 825 is to the right of the horizontal bar 821, the electronic device 101 may raise the adjustment level for the first image 810 and display the second image 830. In (b) of FIG. 8, the electronic device 101 may display the second image 830 with a raised adjustment level as compared to the first image 810.

Although the electronic device 101 displays only the corrected second image 830 on the display 801 in FIG. 8, the electronic device 101 may simultaneously display the first image 810 and the corrected second image 830 on the display 801 according to various embodiments. For example, if the user holds the electronic device 101 in a vertical direction or a portrait mode, the electronic device 101 may display the first image 810 in the upper part of the display 801 and the second image 830 in the lower part of the display 801.

If the user holds the electronic device 101 in a horizontal direction or a landscape mode, the electronic device 101 may display the first image 810 in the left part of the display 801 and the second image 830 in the right part of the display 801.

Figure 9:
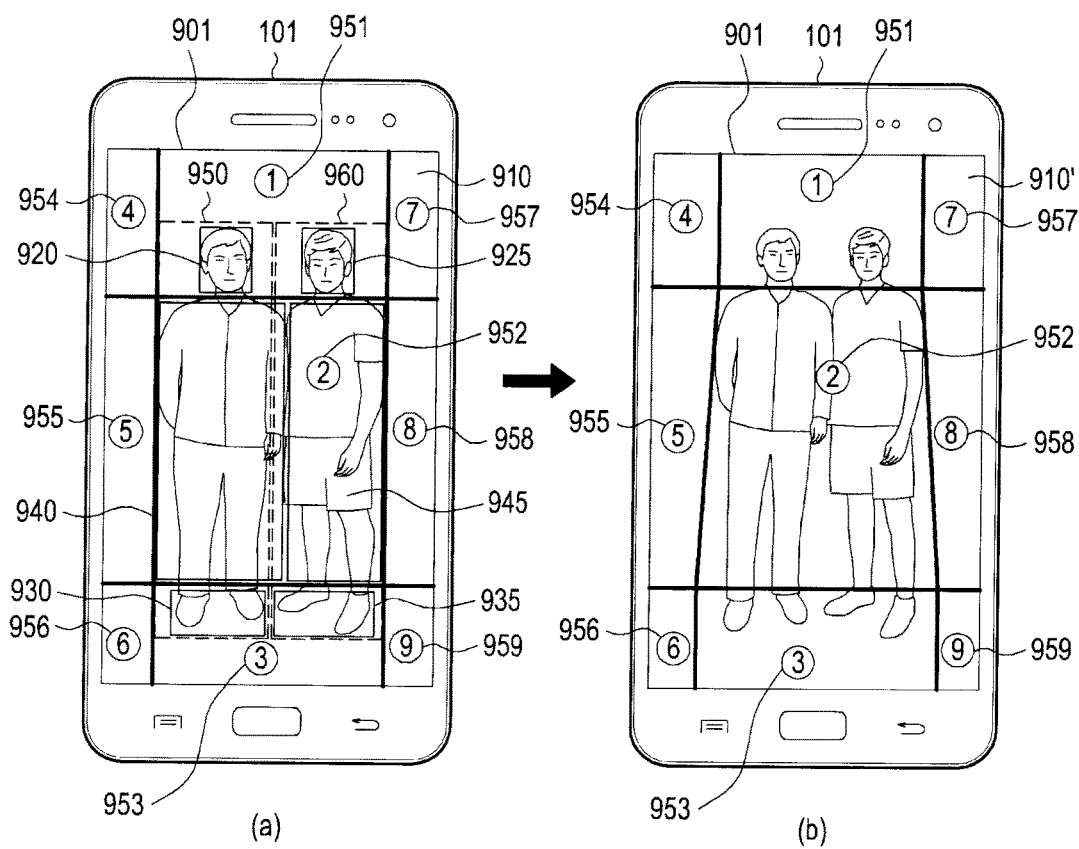
FIG. 9 illustrates a situation where a first image including a plurality of persons is corrected in an electronic device according to various embodiments of the present disclosure.

FIG. 9 illustrates a first image including a plurality of persons. The first image is corrected in the electronic device according to various embodiments of the present disclosure.

Referring to FIG. 9, the electronic device 101 may display a first image 910 on a display 901. The electronic device 101 may detect first sub-region (e.g., first and second face sub-region 920 and 925 and feet sub-regions 930 and 935) and second sub-regions (e.g., first and second torsos and thighs sub-regions 940 and 945), and regions surrounding the objects (e.g., first and second entire bodies 950 and 960) including the first sub-region (e.g., the faces sub-regions 920 and 925 and the feet sub-regions 930 and 935) and the second sub-region (e.g., the torsos and thighs sub-regions 940 and 945), by using, for example, the HOG algorithm and linear classification scheme.

According to various embodiments, the electronic device 101 may calculate a first ratio of the detected first face sub-region 920 to the first entire region surrounding the body 950 and a second ratio of the second face sub-region 925 to the second region surrounding the entire body 960. If a difference between the calculated first and second ratios falls within a preset range, the electronic device 101 may correct the regions surrounding the bodies 950 and 960 together through the process described with reference to FIGS. 7A and 7B. However, the present disclosure is not limited to this example, and the electronic device 101 may separately perform correction with respect to the regions surrounding bodies 950 and 960, respectively.

Referring to FIG. 9, the electronic device 101 may divide the first image 910 into nine divisions. Division of the first image 910 may be performed based on the detected sub-regions 920, 925, 930, 935, 940, and 945. The electronic device 101 may divide the first image 910 such that the detected face sub-regions 920 and 925 belong to a first division 951. The electronic device 101 may divide the first image 910 such that the detected torsos and thighs sub-regions 940 and 945 belong to a second division 952 and the detected feet sub-regions 930 and 935 belong to a third division 953.

The electronic device 101 may correct the first image 910 based on a calculated ratio. For example, the electronic device 101 may calculate a ratio of a length from the end of the detected face sub-regions 920 and 925 to the end of the detected feet sub-regions 930 and 935 to a length of the detected face sub-regions 920 and 925 as 6:1. In this case, the electronic device 101 may adjust the calculated ratio of the length of the regions surrounding the bodies to the length of the detected face sub-regions 920 and 925 to an ideal ratio of the length of the body to the length of the face, e.g., 8:1. However, the ratio of the length of the body to the length of the face is not limited to this example.

According to various embodiments, the electronic device 101 may reduce the size of the first division 951 to reduce the size of the face sub-regions 920 and 925. The electronic device 101 may perform perspective transformation on the torsos and thighs sub-region 940 and 945 to adapt to the reduced face size. For example, the electronic device 101 transforms positions of the upper end part of the second division 952 to adapt to the reduced first division 951.

The electronic device 101 may reduce the height (or the vertical side length) of the fourth division 954 to adapt to the height of the first division 951. Likewise, the electronic device 101 may change the height of the seventh division 957 to adapt to the height of the first division 951.

According to various embodiments, the electronic device 101 may obtain changed coordinates of vertices of the fifth division 955 and corrects the fifth division 955 to adapt to the position of the left side of the perspective-transformed second division 952. In the same manner, the electronic device 101 may obtain changed coordinates of the vertices of the eighth division 958 and corrects the eighth division 958 to adapt to the position of the right side of the perspective-transformed second division 952.

Through the foregoing process, the electronic device 101 may correct and then combine the divisions 951 through 959, thus generating a second image 910'.

Figure 10A:
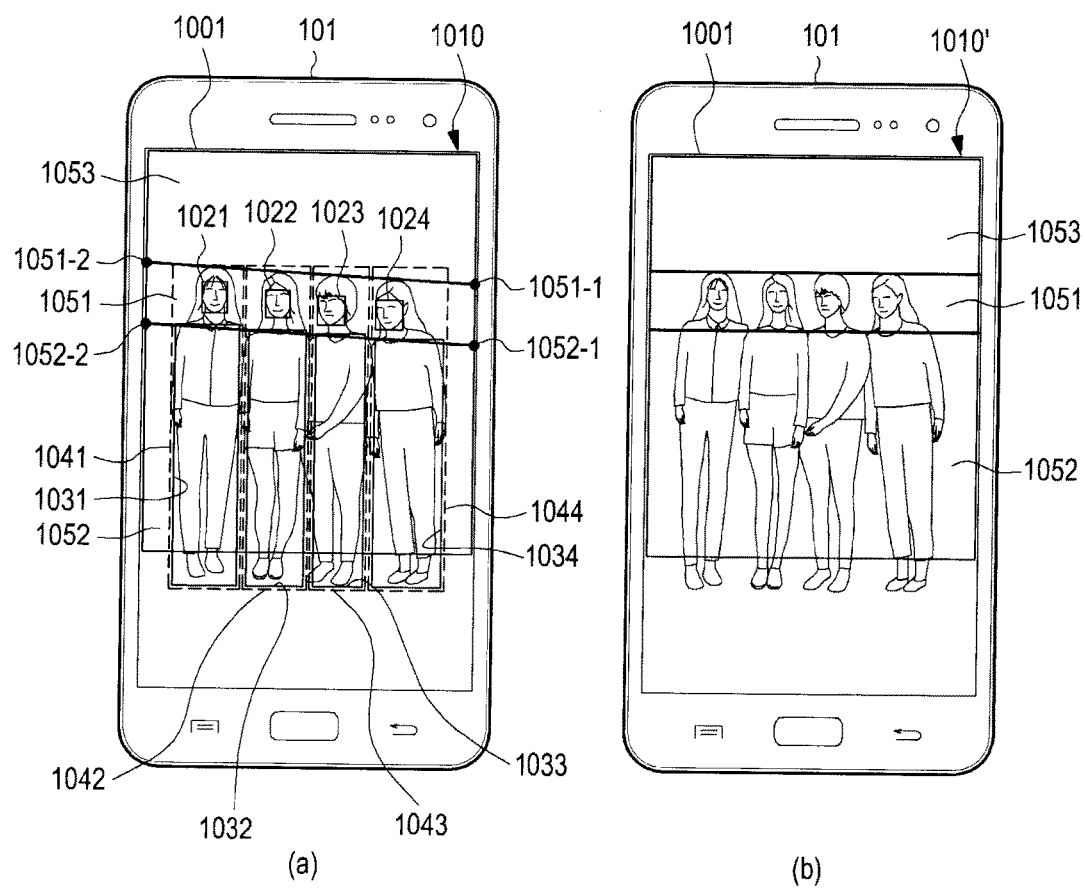
FIG. 10A and FIG. 10B illustrate another situation where a first image including a plurality of persons is corrected in an electronic device according to various embodiments of the present disclosure.
Figure 10B:
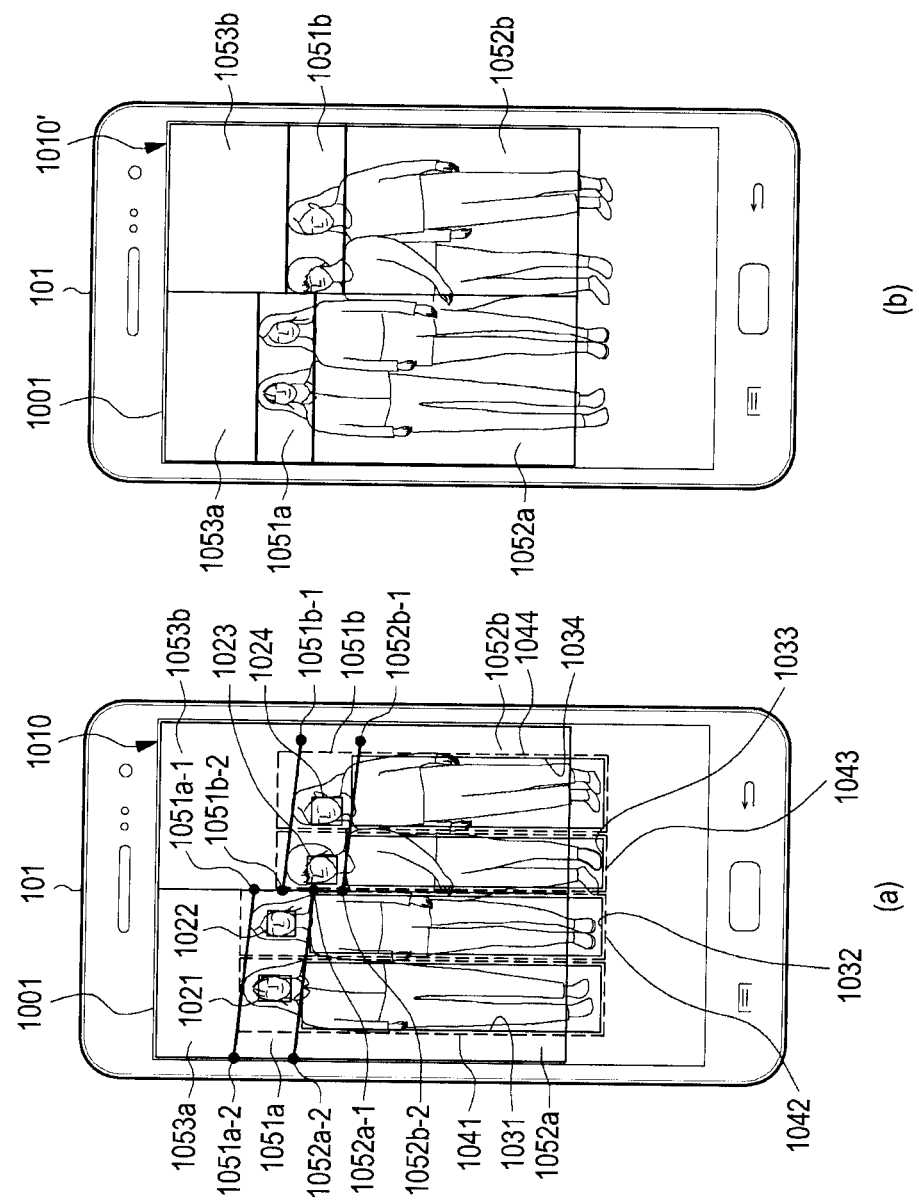

FIGS. 10A and 10B illustrate another situation where a first image including a plurality of persons is corrected in an electronic device according to various embodiments of the present disclosure.

Referring to FIG. 10A, the electronic device 101 may display a first image 1010 on a display 1001. The electronic device 101 may detect first sub-regions (e.g., first through fourth face sub-regions 1021, 1022, 1023, and 1024) and second sub-regions (e.g., first through fourth torso and thigh sub-regions 1031, 1032, 1033, and 1034), and regions surrounding the objects including the first sub-regions 1021, 1022, 1023, and 1024 and the second sub-regions 1031, 1032, 1033, and 1034, by using, for example, the HOG algorithm and linear classification scheme.

According to various embodiments, the electronic device 101 may calculate a ratio of each of the detected face sub-regions 1021, 1022, 1023, and 1024 to each region surrounding the first through fourth bodies 1041, 1042, 1043, and 1044, respectively. The electronic device 101 may determine that a ratio of the first face sub-region 1021 to the region surrounding the first body 1041, a ratio of the second face sub-region 1022 to the region surrounding the second body 1042, a ratio of the third face sub-region 1023 to the region surrounding the third body 1043, and a ratio of the fourth face sub-region 1024 to the region surrounding the fourth body 1044, wherein the first through fourth bodies are each different, regions surrounding the first through fourth bodies are non-overlapping.

According to various embodiments, if the calculated ratios are different from one another in this way, the electronic device 101 may approximate a region 1051 including the first sub-regions 1021, 1022, 1023, and 1024 and a region 1052 including the second sub-regions 1031, 1032, 1033, and 1034 to trapezoid shapes, respectively, and then apply perspective transformation to make each of the regions 1051 and 1052 rectangular in shape, thereby applying different levels of correction to each body.

However, the present disclosure is not limited to this example. For example, the electronic device 101 may approximate each region to a trapezoid shape and then perform perspective transformation to make each region have a shape in the middle stage of transformation into a rectangular shape. That is, the electronic device 101 changes a rate or degree in which perspective transformation is performed.

Referring to (a) and (b) of FIG. 10A, the electronic device 101 may perform perspective transformation with respect to the region 1051 including the first partial sub-regions 1021, 1022, 1023, and 1024 and the region 1052 including the second sub-regions 1031, 1032, 1033, and 1034.

More specifically, the electronic device 101 may perform perspective transformation such that a first vertex 1051-1 of the region 1051 including the first partial sub-regions 1021, 1022, 1023, and 1024 and a first vertex 1052-1 of the region 1052 including the second sub-regions 1031, 1032, 1033, and 1034 are horizontal to a second vertex 1051-2 of the region 1051 including the first sub-regions 1021, 1022, 1023, and 1024 and a second vertex 1052-2 of the region 1052 including the second sub-regions 1031, 1032, 1033, and 1034.

In this case, the electronic device 101 may perform perspective transformation with respect to a background region 1053 above the region 1051 including the first sub-regions 1021, 1022, 1023, and 1024 to adapt to a result of perspective transformation of the region 1051 including the first sub-regions 1021, 1022, 1023, and 1024.

Through the foregoing process, the electronic device 101 may generate a second image 1010'.

According to various embodiments, if positions of detected faces have distance differences greater than a preset distance, the electronic device 101 may set a plurality of groups for the detected faces and performs image distortion correction.

Referring to FIG. 10B, the electronic device 101 may detect the face sub-regions 1021, 1022, 1023, and 1024 and the torso and thigh sub-regions 1031, 1032, 1033, and 1034 from the first image 1001 as described with reference to FIG. 10A. The electronic device 101 may detect the regions surrounding the objects 1041, 1042, 1043, and 1044 including the face sub-regions 1021, 1022, 1023, and 1024 and the torso and thigh sub-regions 1031, 1032, 1033, and 1034, respectively, and calculates a ratio of each of the face sub-regions 1021, 1022, 1023, and 1024 to each of the regions surrounding the objects 1041, 1042, 1043, and 1044 (or each of the torsos and thigh sub-regions 1031, 1032, 1033, and 1034), respectively.

According to various embodiments, if positions of the detected faces have distance differences greater than a preset distance, the electronic device 101 may set a plurality of groups for the detected faces. For example, the electronic device 101 may divide the faces sub-regions 1021, 1022, 1023, and 1024 into a first face region 1051*a* and a second face region 1051*b*. Thus, the electronic device 101 may divide the torsos and thighs sub-regions 1031, 1032, 1033, and 1034 into a first torso and thigh region 1052*a* and a second torso and thigh region 1052*b*.

Referring to (a) and (b) of FIG. 10B, the electronic device 101 may perform perspective transformation with respect to the first face region 1051*a* and the first torso and thigh region 1052*a*. More specifically, the electronic device 101 may perform perspective transformation such that a first vertex 1051*a*-1 of the first face region 1051*a* and a first vertex 1052*a*-1 of the first torso and thigh region 1052*a* are horizontal to a second vertex 1051*a*-2 of the first face region 1051*a* and a second vertex 1052*a*-2 of the first torso and thigh region 1052*a*.

Likewise, the electronic device 101 may perform perspective transformation with respect to the second face region 1051*b* and the second torso and thigh region 1052*b*. More specifically, the electronic device 101 may perform perspective transformation such that a first vertex 1051*b*-1 of the second face region 1051*b* and a first vertex 1052*b*-1 of the second torso region 1052*b* are horizontal to a second vertex 1051*b*-2 of the second face region 1051*b* and a second vertex 1052*b*-2 of the second torso region 1052*b*.

In this case, the electronic device 101 may perform perspective transformation with respect to background regions 1053*a* and 1053*b* above the first face region 1051*a* and the second face region 1051*b* to adapt to a result of perspective transformation of the first face region 1051*a* and the second face region 1051*b*.

Figure 11:
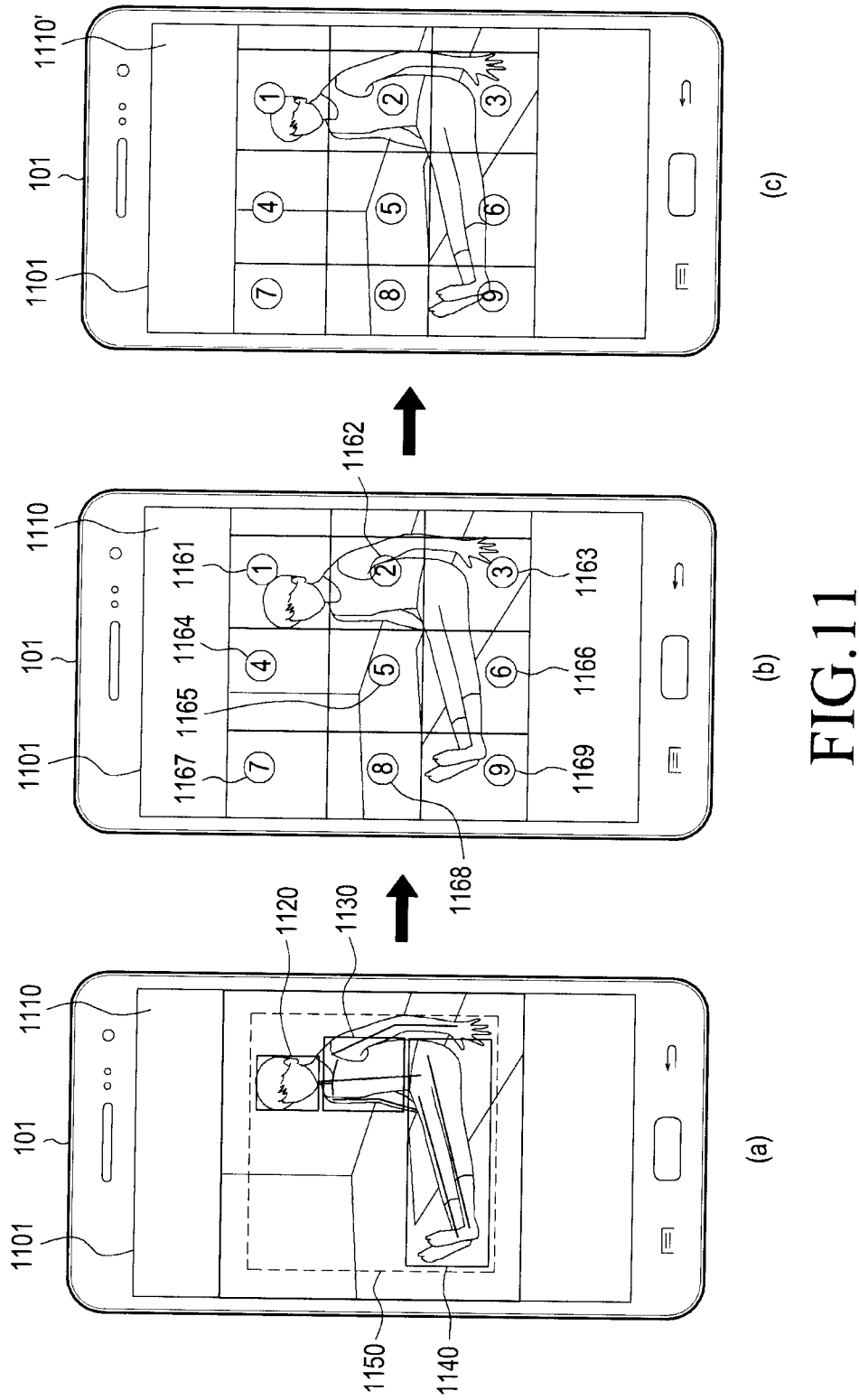
FIG. 11 illustrates a situation where an electronic device corrects a body in various poses according to various embodiments of the present disclosure.

FIG. 11 illustrates a situation where an electronic device corrects a body in various poses according to various embodiments of the present disclosure.

According to various embodiments, the electronic device 101 may detect human body parts by using the DNNs-based body part detection and the skeleton extraction algorithm. When a human is detected from an image by using the DNNs-based body part detection and the skeleton extraction algorithm, the electronic device 101 determines a simple model such as an edge or a point of an input image and then determines a joint, a body part, and/or the like, which are complex models where simple models are combined. Thus, the electronic device 101 may detect body parts of a human photographed in various poses from the image.

Referring to (a) of FIG. 11, the electronic device 101 may display a first image 1110 on a display 1101. The electronic device 101 may detect a first sub-region (e.g., a face sub-region 1120) and a second partial region (e.g., a torso sub-region 1130), and a third partial region (e.g., legs sub-region 1140) and detect a region surrounding the object (e.g., an entire body 1150) including the first sub-region (e.g., the face sub-region 1120), the second sub-region (e.g., the torso sub-region 1130), and the third sub-region (e.g., the legs sub-region 1140).

According to various embodiments, the electronic device 101 may calculate a ratio of the detected face sub-region 1120 to the region surrounding the entire body 1150.

Referring to (b) of FIG. 11, the electronic device 101 may divide the first image 1110 into nine regions. Division of the first image 1110 may be performed based on the detected sub-regions 1120, 1130, and 1140. For example, the electronic device 101 can divide the image into three columns of three rows of divisions. The rows can be divided by a line between detected sub-regions 1120 and 1130 and detected sub-region 1130 and sub-region 1140. The columns can be divided by the left vertical border of sub-region 1130 and another line spaced apart from the left vertical border by the width of the sub-region 1130. The electronic device 101 may divide the first image 1110 such that the detected face sub-region 1120 belongs to a first division 1161. The electronic device 101 may divide the first image 1110 such that the detected legs sub-region 1140 belongs to a third division 1163, a sixth division 1166, and a ninth division 1169.

The electronic device 101 corrects the first image 1110 based on a calculated ratio. For example, the electronic device 101 may calculate a ratio of the length of the region surrounding the detected body 1150 to the length of the detected face sub-region 1120 as 6:1. In this case, the electronic device 101 may correct the calculated ratio of the length of the region surrounding the detected entire body 1150 to the length of the detected face sub-region 1120 to an ideal ratio of the length of the body to the length of the face, e.g., 8:1. However, the ratio of the length of the body to the length of the face is not limited to this example.

According to various embodiments, the electronic device 101 may reduce the size of the first division 1161 to reduce the size of the face sub-region 1120. In this case, the electronic device 101 may reduce the height (or the right vertical side length) of the fourth division 1164 to adapt to the height (or the vertical length) of the first division 1161.

According to various embodiments, the electronic device 101 may change the size of the third division 1163 and the size of the sixth division 1166 to adapt to the size-reduced first division 1161. That is, the electronic device 101 may horizontally extend the third division 1163 and the sixth division 1166 to increase the leg length. As a result, a ratio of the face sub-region 1120 to the entire body 1150 in length may be 1:8.

Referring to (c) of FIG. 11, through the foregoing process, the electronic device 101 may correct and then combine the divisions 1161 through 1169, thus generating a second image 1110'.

Figure 12A:
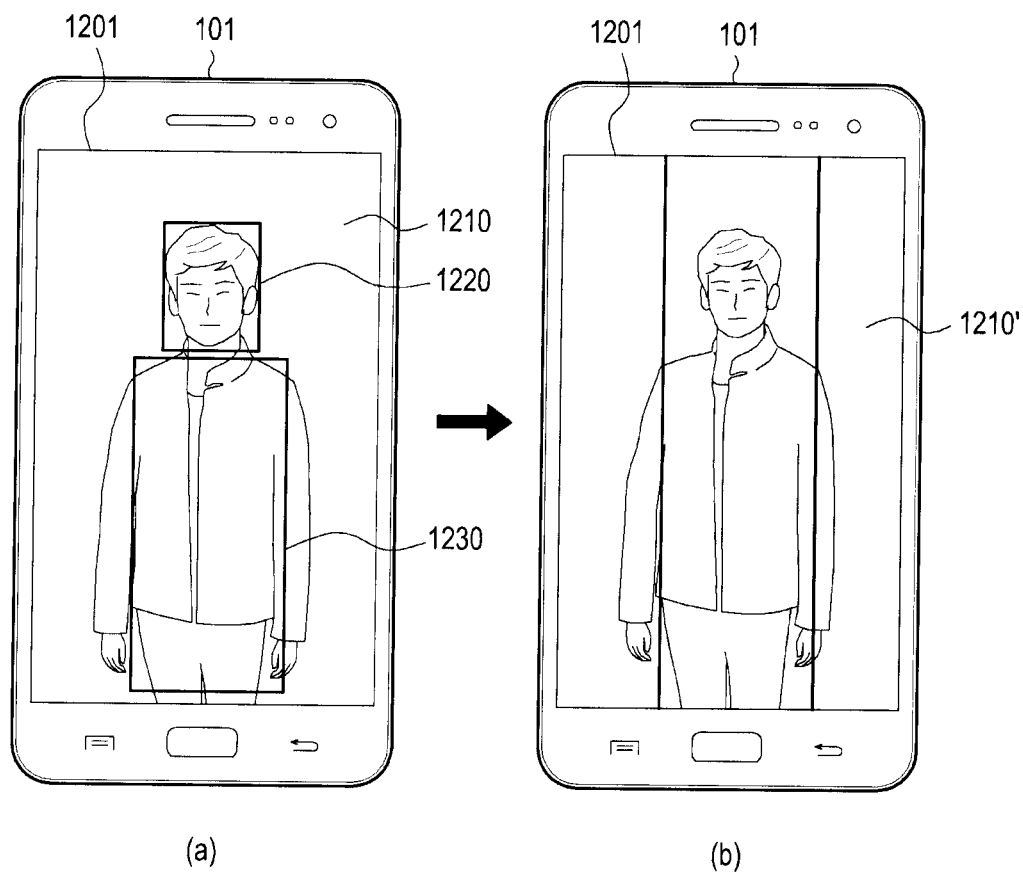
FIG. 12A and FIG. 12B illustrate a situation where an electronic device performs correction differently depending on a gender of a detected person, according to various embodiments of the present disclosure.
Figure 12B:
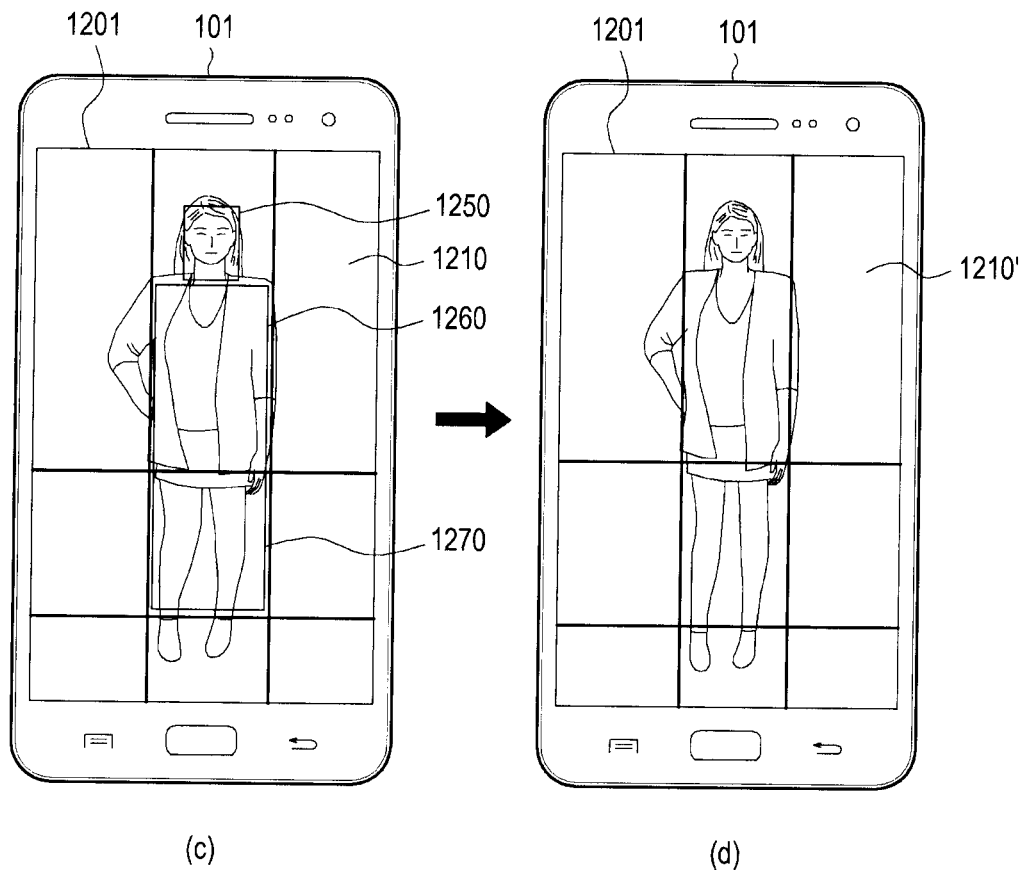

FIGS. 12A and 12B illustrate a situation where an electronic device performs correction differently depending on a gender of a detected person, according to various embodiments of the present disclosure.

FIG. 12A shows a correction situation when a man is detected, and FIG. 12B shows a correction situation when a woman is detected.

According to various embodiments, the electronic device 101 may detect a face from an input first image 1210 and identify a gender of the detected face. The electronic device 101 may apply different correction schemes based on the gender of the detected face.

Referring to (a) of FIG. 12A, the electronic device 101 may display a first image 1210 on a display 1201. The electronic device 101 may detect a first sub-region (e.g., a face sub-region 1220) and a second sub-region (e.g., a torso sub-region 1230). The electronic device 101 may identify the gender of the detected face sub-region 1220 as male. If the detected face sub-region 1220 is of a man, the electronic device 101 may perform correction in such a way to widen the shoulder and reduce the face size.

Referring to (b) of FIG. 12A, the electronic device 101 may reduce the size of the detected face sub-region 1220. The electronic device 101 may perform correction to horizontally extend the detected torso sub-region 1230. However, the present disclosure is not limited to this example. For example, the electronic device 101 may apply perspective transformation with respect to the torso sub-region 1230 to generate an image having little distortion. The electronic device 101 combines the corrected sub-regions 1220 and 1230 and displays a second image 1210'.

Referring to (c) of FIG. 12B, the electronic device 101 displays the first image 1210 on the display 1201. The electronic device 101 may detect first sub-region (e.g., a face sub-region 1250 and legs sub-region 1270) and a second sub-region (e.g., a torso sub-region 1260). The electronic device 101 may identify the gender of the detected face sub-region 1250 as female. If the detected face sub-region 1250 is of a woman, the electronic device 101 may perform correction to reduce the size of the face sub-region 1250, narrow the torso sub-region 1260, and lengthen the legs sub-region 1270.

Referring to (d) of FIG. 12B, the electronic device 101 may reduce the size of the detected face sub-region 1250. The electronic device 101 may perform correction to horizontally reduce the detected torso sub-region 1260 and to vertically increase the detected legs sub-region 1270. However, the present disclosure is not limited to this example. For example, the electronic device 101 may apply perspective transformation with respect to the torso sub-region 1260 to generate an image having little distortion. A way for the electronic device 101 to change the size of the face sub-region 1250, the size of the torso sub-region 1260, and the size of the legs sub-region 1270 has been described above in detail, and thus will not be described at this time.

Figure 13:
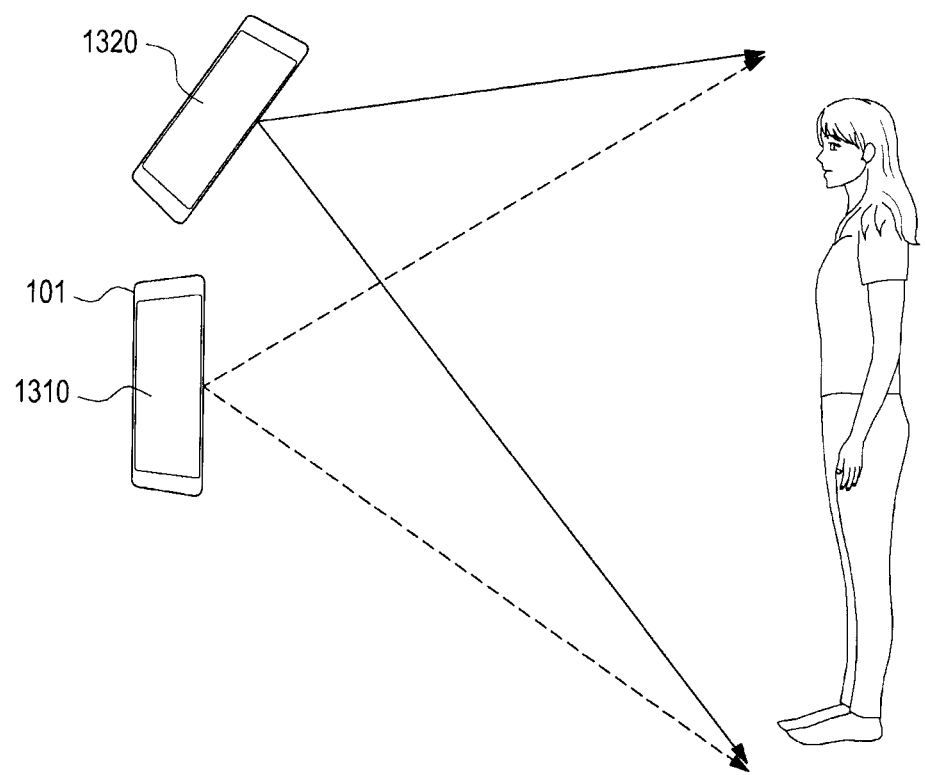
FIG. 13 illustrates a situation where an electronic device determines whether to correct an image according to various embodiments of the present disclosure.

FIG. 13 illustrates a situation where an electronic device determines whether to correct an image according to various embodiments of the present disclosure.

The electronic device 101 may determine whether to perform correction depending on a photographing condition. For example, if photographing is not performed in a horizontal direction or a portrait mode, the electronic device 101 may determine that distortion may occur in a captured image. If a distance to an object is less than a preset value, the electronic device 101 may determine that distortion may occur in a captured image. Thus, the electronic device 101 may determine whether to correct an image based on a condition in image capturing.

Referring to FIG. 13, the electronic device 101 may sense a photographing direction by using an acceleration sensor (240E of FIG. 2), a gesture sensor (240A of FIG. 2), a gyro sensor (240B of FIG. 2), and/or the like. For example, if the electronic device 101 is in a first position 1310, the electronic device 101 may sense that the photographing direction is the horizontal direction. The electronic device 101 calculates the distance to the object by using a camera module (291 of FIG. 2). Thus, if the photographing direction is the horizontal direction and the distance to the object is greater than the preset value, the electronic device 101 may determine that it is not necessary to perform correction with respect to the captured image.

If the electronic device 101 is in a second position 1320, the electronic device 101 may sense that the photographing direction is not the horizontal direction, by using an acceleration sensor (240E of FIG. 2), a gesture sensor (240A of FIG. 2), a gyro sensor (240B of FIG. 2), and/or the like. The electronic device 101 calculates the distance to the object by using a camera module (291 of FIG. 2). Thus, if the photographing direction is not the horizontal direction and the distance to the object is less than the preset value, the electronic device 101 may determine that it is necessary to perform correction with respect to the captured image.

Figure 14:
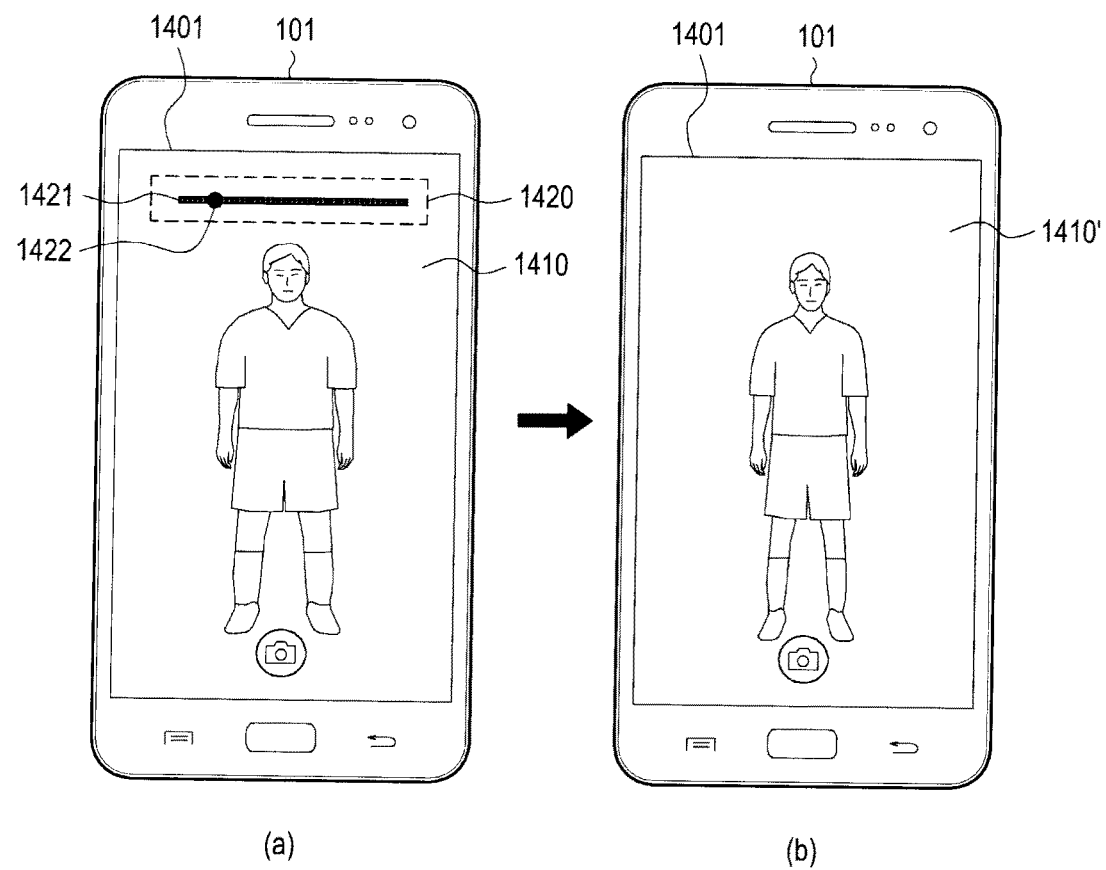
FIG. 14 illustrates a situation where an image captured using an electronic device is automatically corrected according to various embodiments of the present disclosure.

FIG. 14 illustrates a situation where an image captured using an electronic device is automatically corrected according to various embodiments of the present disclosure.

Referring to (a) of FIG. 14, the electronic device 101 may activate a photographing function. Once the photographing function is activated, the electronic device 101 may display an image input through a camera module (291 of FIG. 2) as a first image 1410 on a display 1401.

According to various embodiments, the electronic device 101 may determine whether to perform image correction in a photographing standby state. For example, the electronic device 101 may activate an image correction function in a photographing mode or a photographing setting function. In this case, the electronic device 101 may display a user interface 1420 for determining an image correction level on the display 1401.

According to various embodiments, the user interface 1420 may include an indicating dot 1422 on a horizontal bar 1421. However, the configuration of the user interface 1420 is not limited to this example. The user may determine the correction level while moving the indicating dot 1422 on the user interface 1420. The electronic device 101 determines a correction strength of an image to be captured, based on the user-determined correction level.

Referring to (b) of FIG. 14, the electronic device 101 may capture an image input through the camera module (291 of FIG. 2). The electronic device 101 may perform correction with respect to a human detected from the image based on the image correction level set prior to photographing. The electronic device 101 may store the corrected second image 1410' in a memory (not shown). The electronic device 101 may separately store a non-corrected image. Thus, the user may check both a corrected image and a non-corrected image when necessary.

Figure 15:
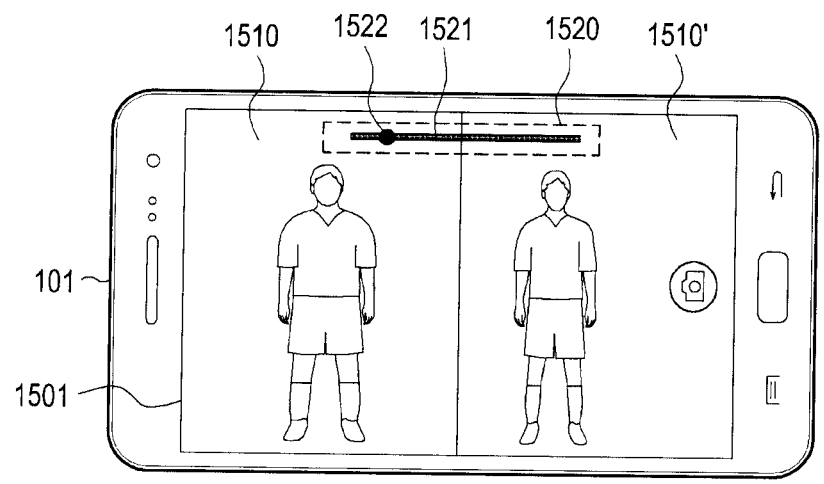
FIG. 15 illustrates a situation where an image is corrected and displayed before being captured using an electronic device according to various embodiments of the present disclosure.

FIG. 15 illustrates a situation where an image is corrected and displayed before being captured using an electronic device according to various embodiments of the present disclosure.

Referring to FIG. 15, the electronic device 101 may activate a photographing function. Once the photographing function is activated, the electronic device 101 may display an image input through a camera module (291 of FIG. 2) as a first image 1510 on a display 1501.

According to various embodiments, the electronic device 101 may display a corrected second image 1510' in the photographing standby state. For example, the electronic device 101 may store an image input through the camera module (291 of FIG. 2) in a temporary memory (not shown) and correct the image, and display the corrected image on the display 1501.

According to various embodiments, the electronic device 101 may divide the display 1501 to display the first image 1510 and the second image 1510'. However, the present disclosure is not limited to this example. For example, the electronic device 101 including a dual display structure may display the first image 1510 on a display and the second image 1510' on the other display.

The electronic device 101 may display a user interface 1520 for adjusting a correction level prior to photographing. The user interface 1520 may be in a form in which an indicating dot 1522 is displayed on a longitudinal bar 1521. However, the present disclosure is not limited to this example. The user may determine the correction level by controlling the user interface 1520.

As such, the electronic device 101 according to various embodiments may show a before-correction image and an after-correction image to the user before photographing, allowing the user to expect a photographing result.

A term "module" used herein may mean, for example, hardware or a combination of hardware and software resident in said hardware, and may be used interchangeably with terms such as logic, a logic block, a part, or a circuit. The "module" may be a part configured integrally, a minimum unit or a portion thereof performing one or more functions.

The "module" may be implemented mechanically or electronically, and may include an application-specific integrated circuit (ASIC) chip, field-programmable gate arrays (FPGAs), and a programmable-logic device performing certain operations already known or to be developed.

At least a part of an apparatus (e.g., modules or functions thereof) or a method (e.g., operations) according to various embodiments may be implemented with an instruction stored in a computer-readable storage medium (e.g., the memory 130) in the form of a programming module. When the instructions are executed by a processor (for example, the processor 120), the processor may perform functions corresponding to the instructions. The computer-readable recording medium includes hard disk, floppy disk, or magnetic media (e.g., a magnetic tape, optical media (e.g., compact disc read only memory (CD-ROM) or digital versatile disc (DVD), magneto-optical media (e.g., floptical disk), an embedded memory, and/or the like. The instructions may include a code generated by a compiler or a code executable by an interpreter.

Modules or programming modules according to various embodiments of the present disclosure may include one or more of the foregoing elements, have some of the foregoing elements omitted, or further include additional other elements. Operations performed by the modules, the programming modules or other elements according to various embodiments may be executed in a sequential, parallel, repetitive or heuristic manner, or at least some of the operations may be executed in different orders, and may be omitted, or other operations may be added.

The electronic device according to various embodiments displays a first image on a display, selects a first region including a first partial region and a second partial region from the first image, applies a first correction scheme to the first partial region and a second correction scheme to the second partial region, and generates a second image including the corrected first partial region and the corrected second partial region. In this way, the electronic device may generate the second image having improved quality.

While embodiments of the present disclosure have been described, various changes may be made without departing the scope of the present disclosure. Therefore, the scope of the present disclosure should be defined by the appended claims and equivalents thereof, rather than by the described embodiments.

What is claimed is:

1. An electronic device comprising:
   a display configured to display a first image; and
   one or more processors electrically connected with the display, wherein the one or more processors are configured to:
identify a region which includes a first object comprising a first sub-region which includes a first part of the first object and a second sub-region which includes a second part of the first object from the first image, identify a first ratio of the first sub-region to the first image and a second ratio of the second sub-region to the first image, adjust the first ratio by applying a first correction scheme to the first sub-region which includes the first part of the first object, and the second ratio by applying a second correction scheme to the second sub-region which includes the second part of the first object, and provide a second image comprising the corrected first sub-region which includes the first part of the first object and the corrected second sub-region which includes the second part of the first object,
wherein the first correction scheme is a correction scheme that changes a size of the first sub-region which includes the first part of the first object, and the second correction scheme is a correction scheme that performs perspective transformation with respect to the second sub-region which includes the second part of the first object.

2. The electronic device of claim 1, wherein the one or more processors are further configured to identify the second correction scheme with respect to the second sub-region which includes the second part of the first object based on a result of correction with respect to the first sub-region which includes the first part of the first object to which the first correction scheme is applied.

3. The electronic device of claim 1, wherein the one or more processors are further configured to identify a third correction scheme with respect to a region which includes a second object of the first image, wherein the region which includes the first object and the region which includes the second object are non-overlapping.

4. The electronic device of claim 3, wherein the one or more processors are further configured to identify the third correction scheme with respect to the region which includes the second object based on at least one of a result of correction with respect to the first sub-region which includes the first part of the first object and a result of correction with respect to the second sub-region which includes the second part of the first object.

5. An electronic device comprising:
a display configured to display a first image; and
one or more processors electrically connected with the display,
wherein the one or more processors are configured to:
identify a region which includes a first object from the first image comprising a first sub-region which includes a first part of the first object and a second sub-region which includes a second part of the first object, identify the first image into a plurality of divisions comprising a first division and a second division, identify the first sub-region which includes the first part of the first object in the first division, identify the second sub-region which includes the second part of first object in the second division, identify a first ratio of the first sub-region to the first image and a second ratio of the second sub-region to the first image, adjust the first ratio by applying a first correction scheme to the first division and the second ratio by applying a second correction scheme to the second division, and provide a second image comprising the corrected first division and the corrected second division,
wherein the first correction scheme is a correction scheme that changes a size of the first division, and the second correction scheme is a correction scheme that performs perspective transformation with respect to the second division.

6. The electronic device of claim 5, wherein the one or more processors are further configured to identify the second correction scheme with respect to the second division based on a result of correction with respect to the first division to which the first correction scheme is applied.

7. The electronic device of claim 5, wherein the one or more processors are further configured to apply a third correction scheme with respect to a region which includes a second object of the first image, wherein the region which includes the first object and the region which includes the second object are non-overlapping.

8. The electronic device of claim 7, wherein the one or more processors are further configured to identify the third correction scheme with respect to the region which includes the second object based on at least one of a result of correction with respect to the first division and a result of correction with respect to the second division.

9. The electronic device of claim 5, wherein the first division and the second division are divisions along both horizontal and vertical directions of the first image, and wherein the first correction scheme is applied to the first division along the both horizontal and vertical directions and the second correction scheme is applied to the second division along the both horizontal and vertical directions.

10. A method for controlling an electronic device, the method comprising:
displaying a first image on a display;
identifying, from the first image, a first region which includes a first object in the first image comprising a first sub-region which includes a first part of the first object and a second sub-region which includes a second part of the first object;
identifying a first ratio of the first sub-region to the first image and a second ratio of the second sub-region to the first image;
adjusting the first ratio by applying a first correction scheme to the first sub-region which includes the first part of the first object and the second ratio by applying a second correction scheme to the second sub-region which includes the second part of the first object; and
providing a second image comprising the corrected first sub-region which includes the first part of the first object and the corrected second sub-region which includes the second part of the first object,
wherein the first correction scheme is a correction scheme that changes a size of the first sub-region which includes the first part of the first object, and the second correction scheme is a correction scheme that performs perspective transformation with respect to the second sub-region which includes the second part of the first object.

11. The method of claim 10, wherein the applying of the second correction scheme to the second sub-region which includes the second part of the first object comprises identifying the second correction scheme with respect to the second sub-region which includes the second part of the first object based on a result of correction with respect to the first sub-region which includes the first part of the first object to which the first correction scheme is applied.

12. The method of claim 10, further comprising:
applying a third correction scheme with respect to a second region of the first image except for the first region.

13. The method of claim 12, wherein the applying of the third correction scheme to the second region except for the first region comprises identifying the third correction scheme with respect to the second region based on at least one of a result of correction with respect to the first sub-region which includes the first part of the first object and a result of correction with respect to the second sub-region which includes the second part of the first object.

14. A method for controlling an electronic device, the method comprising:
displaying a first image on a display;
identifying, from the first image, a region which includes a first object comprising a first sub-region which includes a first part of the first object and a second sub-region which includes a second part of the first object;
identify a first ratio of the first sub-region to the first image and a second ratio of the second sub-region to the first image;
dividing the first image into a plurality of divisions comprising a first division and a second division, disposing the first sub-region which includes the first part of the first object in the first division, and disposing the second sub-region surrounding the second part of the first object in the second division;
adjusting the first ratio by applying a first correction scheme to the first division and the second ratio by applying a second correction scheme to the second division; and
providing a second image comprising the corrected first division and the corrected second division,
wherein the first correction scheme is a correction scheme that changes a size of the first sub-region which includes the first part of the first object, and the second correction scheme is a correction scheme that performs perspective transformation with respect to the second sub-region which includes the second part of the first object.

15. The method of claim 14, wherein the applying of the second correction scheme to the second division comprises identifying the second correction scheme with respect to the second division based on a result of correction with respect to the first division to which the first correction scheme is applied.

16. The method of claim 14, further comprising:
applying a third correction scheme with respect to a region which includes a second object of the first image wherein the region which includes the first object and the region which includes the second object are non-overlapping.

17. A non-transitory recording medium having stored therein instructions for executing a method for controlling an electronic device, the method comprising:
displaying a first image on a display;
identifying, from the first image, region which includes a first object comprising a first sub-region which includes a first part of the first object and a second sub-region which includes a second part of the first object;
dividing the first image into a plurality of regions comprising a first division and a second division, disposing the first sub-region which includes the first part of the first object in the first division, and disposing the second sub-region which includes the second part of the first object in the second division;
identifying a first ratio of the first sub-region to the first image and a second ratio of the second sub-region to the first image;
adjusting the first ratio by applying a first correction scheme to the first division and the second ratio by applying a second correction scheme to the second division; and
providing a second image comprising the corrected first division and the corrected second division,
wherein the first correction scheme is a correction scheme that changes a size of the first sub-region which includes the first part of the first object, and the second correction scheme is a correction scheme that performs perspective transformation with respect to the second sub-region which includes the second part of the first object.

* * * * *